(12) United States Patent
Haga et al.

(10) Patent No.: US 10,802,655 B2
(45) Date of Patent: Oct. 13, 2020

(54) TOUCH PANEL AND TOUCH PANEL DEVICE

(71) Applicant: TIANMA JAPAN, LTD., Kawasaki, Kanagawa (JP)

(72) Inventors: Hiroshi Haga, Kawasaki (JP); Daisuke Sugimoto, Kawasaki (JP)

(73) Assignees: TIANMA JAPAN, LTD., Kawasaki, Kanagawa (JP); XIAMEN TIANMA MICRO-ELECTRONICS CO., LTD., Xiamen (CN)

( * ) Notice: Subject to any disclaimer, the term of this patent is extended or adjusted under 35 U.S.C. 154(b) by 0 days.

(21) Appl. No.: 16/234,335

(22) Filed: Dec. 27, 2018

(65) Prior Publication Data

US 2019/0204955 A1 Jul. 4, 2019

(30) Foreign Application Priority Data

Dec. 28, 2017 (JP) .................................. 2017-254195
Oct. 16, 2018 (JP) .................................. 2018-195259

(51) Int. Cl.
| | |
|---|---|
| *G06F 3/044* | (2006.01) |
| *G06F 3/01* | (2006.01) |
| *G06F 3/041* | (2006.01) |
| *G06F 3/0354* | (2013.01) |

(52) U.S. Cl.
CPC .............. *G06F 3/044* (2013.01); *G06F 3/016* (2013.01); *G06F 3/03547* (2013.01); *G06F 3/0416* (2013.01); *G06F 3/0445* (2019.05); *G06F 3/0446* (2019.05); *G06F 3/0448* (2019.05); *G06F 3/04186* (2019.05); *G06F 3/0443* (2019.05); *G06F 2203/04104* (2013.01)

(58) Field of Classification Search
CPC ...... G06F 3/044; G06F 3/0445; G06F 3/0446; G06F 3/0448; G06F 3/04186; G06F 3/016; G06F 3/03547; G06F 3/0416; G06F 3/0443; G06F 2203/04104
See application file for complete search history.

(56) References Cited

U.S. PATENT DOCUMENTS

2013/0307789 A1* 11/2013 Karamath ............... G06F 3/016
                                                            345/173
2014/0192005 A1   7/2014 Wakuda et al.
2017/0371490 A1* 12/2017 Sugimoto ............... G06F 3/016

FOREIGN PATENT DOCUMENTS

| JP | 2013-167953 A | 8/2013 |
|---|---|---|
| WO | 2014/002405 A1 | 1/2014 |

* cited by examiner

*Primary Examiner* — Robert J Michaud
(74) *Attorney, Agent, or Firm* — Sughrue Mion, PLLC

(57) ABSTRACT

A touch panel includes X electrodes and Y electrodes disposed on a support substrate in such a manner that each of the Y electrodes intersects the X electrodes, X floating electrodes laminated on a first insulating layer at places opposed to the X electrodes, Y floating electrodes laminated on the first insulating layer at places opposed to the Y electrodes, and a second insulating layer covering the X floating electrodes and the Y floating electrodes. The area of X electrodes is smaller than the area of X floating electrodes and the area of Y electrodes is smaller than the area of Y floating electrodes in a unit lattice region of a lattice formed of the X electrodes and the Y electrodes. A mutual capacitance generated between an X electrode and a Y electrode decreases when a surface of the second insulating layer is touched by a pointer.

11 Claims, 10 Drawing Sheets

COMPARATIVE EXAMPLE

*COMPARATIVE EXAMPLE*

*COMPARATIVE EXAMPLE*

COMPARATIVE EXAMPLE

COMPARATIVE EXAMPLE

TOUCH PANEL AND TOUCH PANEL DEVICE

CROSS-REFERENCE TO RELATED APPLICATIONS

This Non-provisional application claims priority under 35 U.S.C. § 119(a) on Patent Application No. 2017-254195 filed in Japan on Dec. 28, 2017 and Patent Application No. 2018-195259 filed in Japan on Oct. 16, 2018, the entire contents of which are hereby incorporated by reference.

BACKGROUND

This disclosure relates to a touch panel and a touch panel device.

In recent years, touch panels have been widely known as user-friendly user interface with the prevalence of smartphones and tablet terminals. Touch panels are mounted on the display modules of various electronic devices.

For example, JP 2013-167953 A discloses a touch panel and a display device that attains higher sensitivity without changing the wiring design of the touch panel. Specifically, the capacitive coupling type of touch panel includes a plurality of parallel X electrodes extending in a first direction and a plurality of parallel Y electrodes extending in a second direction that cross the X electrodes with an insulator interposed therebetween on one side of a transparent substrate, and floating electrodes made of a transparent conductive material each provided to cover an intersection of an X electrode and a Y electrode on the other side of the transparent substrate.

Meanwhile, technology using electrostatic force to present a texture on the surface of a touch panel has been developed. For example, WO 2014/002405 A discloses a tactile device that presents a texture. The tactile device according to WO 2014/002405 A has a plurality of electrodes on the same plane; it provides voltage for detecting a touch point to a plurality of electrodes in a period and provides voltage for presenting a texture to the plurality of electrodes in another period.

SUMMARY

An aspect of this disclosure is a touch panel including: a support substrate; a plurality of X electrodes disposed on the support substrate; a plurality of Y electrodes disposed on the support substrate in such a manner that each of the plurality of Y electrodes intersects the plurality of X electrodes and is isolated from the plurality of X electrodes; a plurality of X floating electrodes laminated on a first insulating layer at places opposed to the plurality of X electrodes; a plurality of Y floating electrodes laminated on the first insulating layer at places opposed to the plurality of Y electrodes; and a second insulating layer covering the plurality of X floating electrodes and the plurality of Y floating electrodes. The area of X electrodes is smaller than the area of X floating electrodes and the area of Y electrodes is smaller than the area of Y floating electrodes in a unit lattice region of a lattice formed of the plurality of X electrodes and the plurality of Y electrodes. A mutual capacitance generated between an X electrode and a Y electrode decreases when a surface of the second insulating layer is touched by a pointer.

It is to be understood that both the foregoing general description and the following detailed description are exemplary and explanatory and are not restrictive of this disclosure.

EMBODIMENTS

Hereinafter, embodiments will be described with reference to the accompanying drawings. The embodiments are merely examples to implement this disclosure and are not to limit the technical scope of this disclosure. Elements common to the drawings are denoted by the same reference signs. The drawings may exaggerate the sizes and the shapes of the elements for clarity of explanation.

Figure 1A:
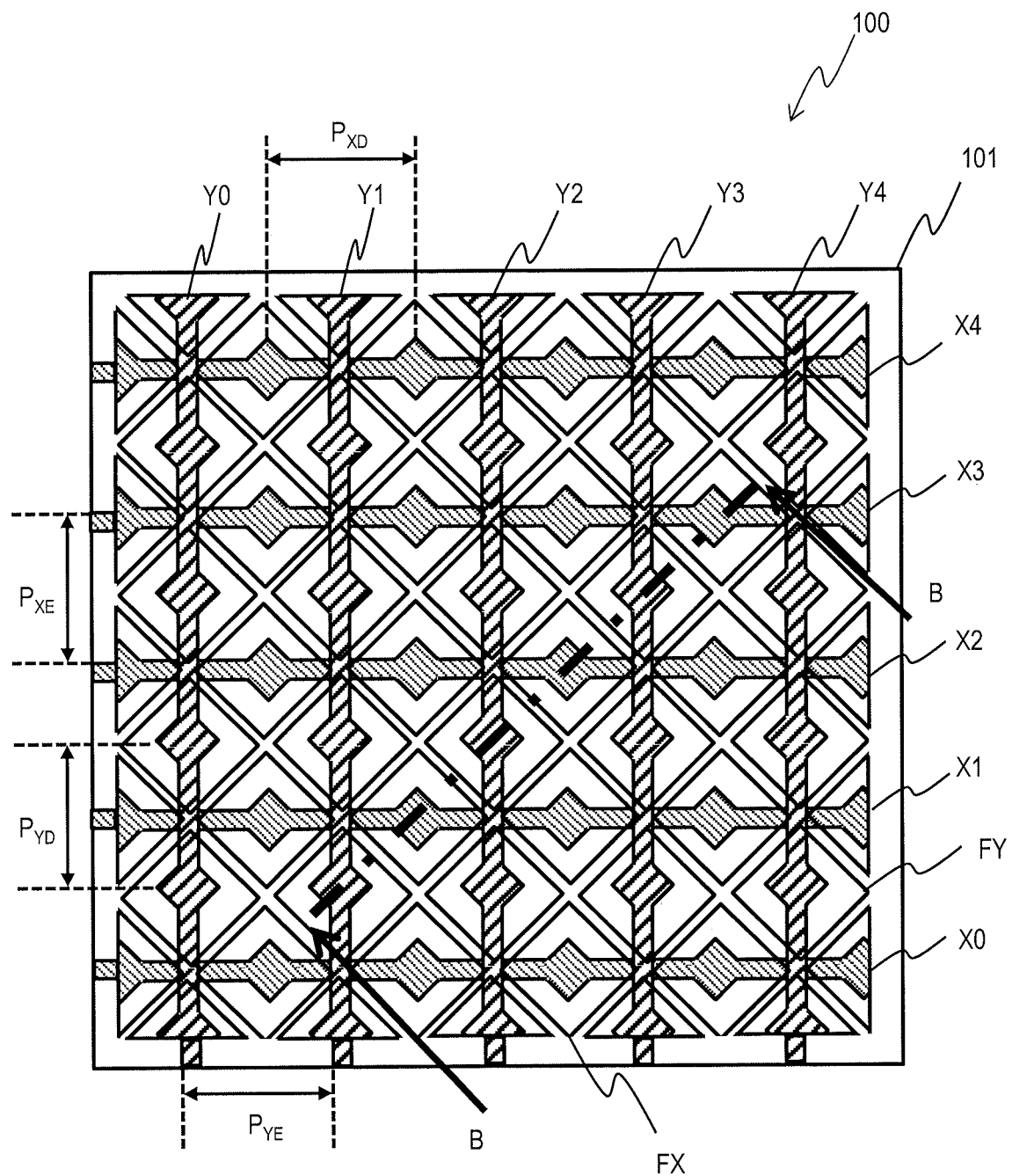
FIG. 1A is a plan diagram schematically illustrating a touch panel.
Figure 1B:
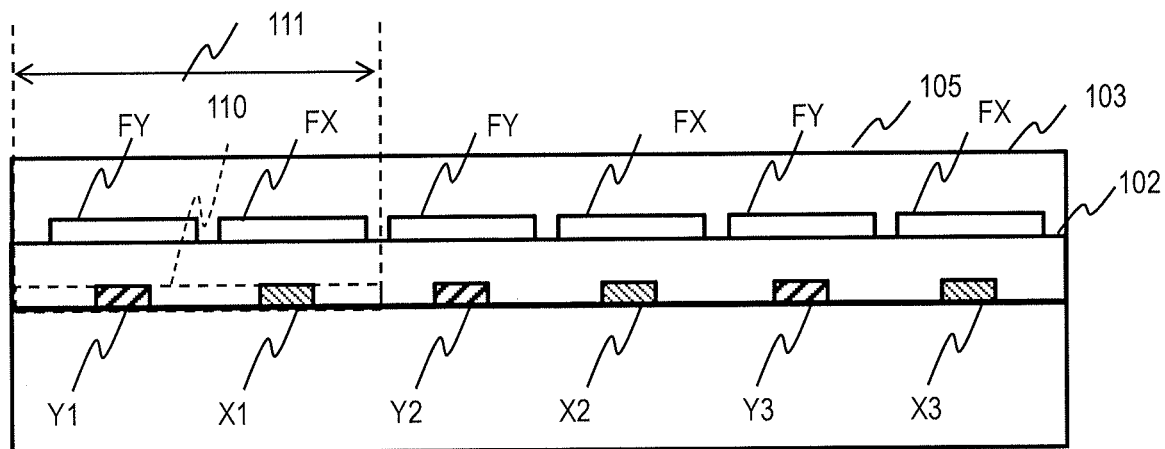
FIG. 1B schematically illustrates a cross-sectional structure of the touch panel cut along the line B-B in FIG. 1A.
Figure 1C:
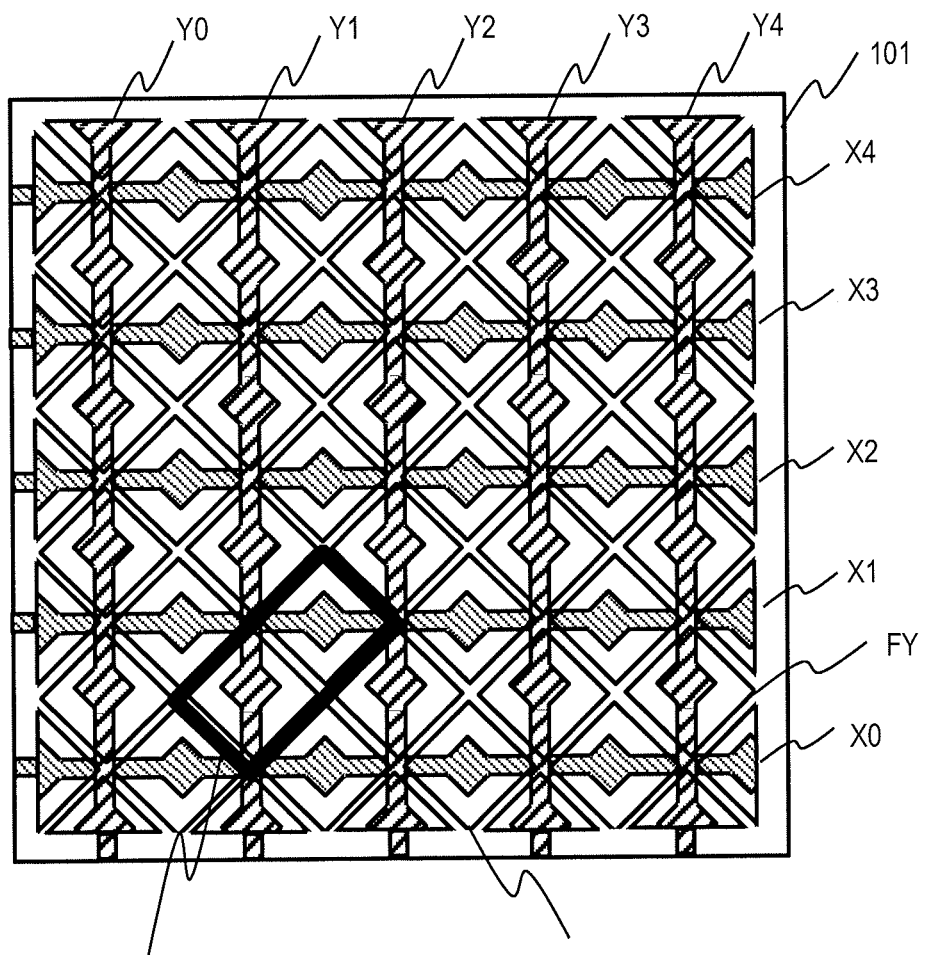
FIG. 1C is a plan diagram schematically illustrating the touch panel.

With reference to FIGS. 1A, 1B, and 1C, a configuration of a touch panel (touch panel board) 100 is described. FIGS. 1A and 1C are plan diagrams schematically illustrating a touch panel 100. FIG. 1B schematically illustrates a cross-sectional structure of the touch panel 100 cut along the line B-B in FIG. 1A.

The touch panel 100 includes a support substrate 101 and further, X electrodes X0 to X4 and Y electrodes Y0 to Y4 disposed on the support substrate 101. Although the example in FIG. 1A includes five X electrodes and five Y electrodes, the number of X electrodes and the number of Y electrodes depend on the design of the touch panel 100. Typically, the X electrodes and the Y electrodes are made of a transparent conductor such as ITO or IZO.

The X electrodes X0 to X4 extend in parallel to one side of the rectangular support substrate 101 and disposed in parallel to one another with spacing. The Y electrodes Y0 to Y4 extend in parallel to another side of the support substrate 101 and disposed in parallel to one another with spacing. Each of the X electrodes X0 to X4 intersects with the Y electrodes Y0 to Y4. The Y electrodes Y0 to Y4 are isolated from the X electrodes X0 to X4 by an insulating film at the intersections.

In the example of FIG. 1A, the X electrodes X0 to X4 extend in the horizontal direction of the drawing. The Y electrodes Y0 to Y4 extend in the vertical direction of the drawing. The X electrodes are orthogonal to the Y electrodes. The X electrodes X0 to X4 do not have to be parallel to one another or parallel to one side of the support substrate 101. The Y electrodes Y0 to Y4 do not have to be parallel to one another or parallel to one side of the support substrate 101. The X electrodes do not have to be orthogonal to the Y electrodes.

In the example illustrated in FIG. 1A, each of the X electrodes X0 to X4 has a shape such that multiple rhombic units are connected by a connector into a string. That is to say, an X electrode is formed by electrically connecting horizontally-adjacent rhombic units with a connector and extends in the horizontal direction. In similar, each of the Y electrodes Y0 to Y4 has a shape such that multiple rhombic units are connected by a connector into a string. That is to say, a Y electrode is formed by electrically connecting vertically-adjacent rhombic units with a connector and extends in the vertical direction. In the example in FIG. 1A, each X electrode and each Y electrode have triangular units at both ends.

When viewed perpendicularly to the main face of the support substrate 101 (in a planar view), the connectors of the rhombic units of the X electrodes X0 to X4 overlap the connectors of the rhombic units of the Y electrodes Y0 to Y4 with an insulating film interposed therebetween. The rhombic units of the X electrodes X0 to X4 do not overlap the rhombic units of the Y electrodes Y0 to Y4. In other words, the rhombic units of the X electrodes and the rhombic units of the Y electrodes are disposed on the same plane.

Each rhombic unit of the X electrodes is located between adjacent Y electrodes and the pitch $P_{XD}$ of the rhombic units of each X electrode is equal to the pitch $P_{YE}$ of the Y electrodes Y0 to Y4. Each rhombic unit of the Y electrodes is located between adjacent X electrodes and the pitch $P_{YD}$ of the rhombic units of each Y electrode is equal to the pitch $P_{XE}$ of the X electrodes X0 to X4.

The shape of the support substrate 101 depends on the design and does not need to be a rectangle. For example, the shape of the support substrate 101 may be a polygon having angles more than four or the sides of the support substrate 101 may be curved. The shapes of the X electrodes and the Y electrodes depend on the design. For example, each electrode may be shaped like a strip (rectangle) or formed by connecting the wide parts of a plurality of units having a specific shape (rhombus in the example of FIG. 1A) with a narrow connector into a string.

The touch panel 100 further includes a plurality of X floating electrodes FX each facing an X electrode and a plurality of Y floating electrodes FY each facing a Y electrode. The X floating electrodes FX and the Y floating electrodes FY are disposed on the support substrate 101. The floating electrodes are electrically floating electrodes that are not supplied with a specific potential. In FIG. 1A, only one of the X floating electrodes is indicated with a reference sign FX and only one of the Y floating electrodes is indicated with a reference sign FY. Typically, the X floating electrodes FX and the Y floating electrodes FY are made of a transparent conductor such as ITO or IZO.

In the example of FIG. 1A, each of the X floating electrodes FX and the Y floating electrodes FY is surrounded by an insulating layer like an island and is distant and isolated from the other electrodes (including the X electrodes, Y electrodes, and the other X floating electrodes and Y floating electrodes). In the example of FIG. 1A, the X floating electrodes FX and the Y floating electrodes FY disposed along the periphery have the identical triangular shapes; the X floating electrodes FX and the Y floating electrodes FY in the inner area have the identical rectangular shapes. The shapes of the X floating electrodes FX and the Y floating electrodes FY depend on the design and these electrodes can have different shapes.

In a planar view, an X floating electrode FX overlaps an X electrode in large part with an insulating layer interposed therebetween. In other words, the overlap area between the X floating electrode FX and one or more X electrodes is larger than the overlap area between the X floating electrode and one or more Y electrodes. In the example of FIG. 1A, each X floating electrode overlaps one whole rhombic unit of an X electrode and parts of the connectors on both ends of the rhombic unit. In the example of FIG. 1A, each X floating electrode FX faces a part of one X electrode sandwiched by Y electrodes and does not face the other X electrodes.

Although there is no overlap area between an X floating electrode FX and a Y electrode in the example of FIG. 1A, an X floating electrode FX can overlap a Y electrode. The X floating electrodes FX are provided on a layer upper than the layer of the X electrodes and the Y electrodes; an insulating layer is interposed between these layers.

In a planar view, a Y floating electrode FY overlaps a Y electrode in large part with an insulating layer interposed therebetween. In other words, the overlap area between the Y floating electrode FY and one or more Y electrodes is larger than the overlap area between the Y floating electrode and one or more X electrodes. In the example of FIG. 1A, each Y floating electrode overlaps one whole rhombic unit of a Y electrode and parts of the connectors on both ends of the rhombic unit. In the example of FIG. 1A, each Y floating electrode FY faces a part of one Y electrode sandwiched by X electrodes and does not face the other Y electrodes.

Although there is no overlap area between a Y floating electrode FY and an X electrode in the example of FIG. 1A, a Y floating electrode FY can overlap an X electrode. The Y floating electrodes FY are provided on a layer upper than the layer of the X electrodes and the Y electrodes; an insulating layer is interposed between these layers.

In the example of FIG. 1A, the X floating electrodes FX disposed horizontally in a row are disposed in the same direction as one X electrode extends so that the X floating electrodes cover the X electrode in a planar view. The centers of the X floating electrodes FX coincide with the centers of the rhombic units of the X electrode. The Y floating electrodes FY disposed vertically in a column are disposed in the same direction as one Y electrode extends so that the Y floating electrodes cover one Y electrode in a planar view. The centers of the Y floating electrodes FY coincide with the centers of the rhombic units of the Y electrode.

With reference to FIG. 1B, the X electrodes X1 to X3, the Y electrodes Y1 to Y3, the X floating electrodes FX, and the Y floating electrodes FY are disposed on the support substrate 101. The X electrodes X1 to X3 and the Y electrodes Y1 to Y3 are covered by a first insulating layer 102; the X floating electrodes FX and the Y floating electrodes FY are covered by a second insulating layer 103. The surface 105 of the second insulating layer 103 is the touch surface to be touched by a pointer (such as a finger or a conductor held by fingers). Hereinafter, the side of the touch surface 105 with respect to the support substrate 101 is referred to as front or upper side. The pointer can be not only a finger but also a stylus (pen). The stylus, which is so-called a passive pointer, is made of conductive material; it is electrically coupled to a finger to function the same as the finger touching the touch surface.

The support substrate 101 is an insulative substrate and typically, it is made of transparent insulative material such as resin or glass. The support substrate 101 can be flexible or inflexible.

The X electrodes X1 to X3 and the Y electrodes Y1 to Y3 are disposed in the horizontal direction in the drawing at equal pitches. The X electrodes are disposed alternate with the Y electrodes. Although the X electrodes X1 to X3 and the Y electrodes Y1 to Y3 in the example of FIG. 1B are provided directly on (in contact with) the support substrate 101, an insulating layer can be interposed between the support substrate 101 and the X electrodes X1 to X3 and the Y electrodes Y1 to Y3.

As illustrated in FIG. 1B, the X electrodes X1 to X3 and the Y electrodes Y1 to Y3 in this example are disposed on the same plane in the area except for the intersections of the X electrodes X1 to X3 and the Y electrodes Y1 to Y3. The X electrodes X1 to X3 and the Y electrodes Y1 to Y3 are covered by the first insulating layer 102. The first insulating layer 102 is composed of one or more insulating layers. An example of the first insulating layer 102 is an acrylic resin layer.

The X floating electrodes FX are provided above the X electrodes X1 to X3 so that the X floating electrodes cover the X electrodes X1 to X3. The first insulating layer 102 is interposed between the X floating electrodes FX and the X electrodes X1 to X3. The distances between the X floating electrodes FX and the X electrodes X1 to X3 are the same.

The Y floating electrodes FY are provided above the Y electrodes Y1 to Y3 so that the Y floating electrodes cover the Y electrodes Y1 to Y3. The first insulating layer 102 is interposed between the Y floating electrodes FY and the Y electrodes Y1 to Y3. The distances between the Y floating electrodes FY and the Y electrodes Y1 to Y3 are the same. In the example of FIG. 1B, the X floating electrodes FX and the Y floating electrodes FY are disposed on the same plane.

The X floating electrodes FX and the Y floating electrodes FY are covered by the second insulating layer 103. The second insulating layer 103 is composed of one or more insulating layers. The second insulating layer 103 can be composed of a lower acrylic resin layer and an upper cover glass, a lower silicon oxide film and an upper hard coat layer, or a lower acrylic resin layer and an upper hard coat layer, for example. As described above, the top face 105 of the second insulating layer 103 is the touch surface to be touched by a pointer.

In the example of FIGS. 1A and 1B, each of the X floating electrodes FX and the Y floating electrodes FY is an island-like electrode isolated from the other conductors. In another example, a plurality of X floating electrodes FX can be connected by conductive connectors. For example, the X floating electrodes FX in a row opposed to one X electrode can be connected into a string. The plurality of X floating electrodes connected by connectors can be regarded as one X floating electrode.

In similar, a plurality of Y floating electrodes FY can be connected by conductive connectors. For example, the Y floating electrodes FY in a column opposed to one Y electrode can be connected into a string. The plurality of Y floating electrodes connected by connectors can be regarded as one Y floating electrode. The process of forming the X floating electrodes FX and the Y floating electrodes FY can be facilitated by using island-like conductors isolated from the other conductors.

The X electrodes X1 to X3 and the Y electrodes Y1 to Y3 form a planar lattice. As illustrated in FIGS. 1B and 1C, this planar lattice is composed of a plurality of lattice units 110. A lattice unit 110 is a unit of repetition in the lattice. The lattice unit 110 can take a plurality of different configurations; FIGS. 1B and 1C provide one of the configurations for a lattice unit. In a planar view, the region 111 defined by a line surrounding the lattice unit 110 is referred to as lattice unit region.

In the example of FIGS. 1B and 1C, the lattice unit 110 (lattice unit region 111) has a rectangular shape in a planar view and includes a part of one X electrode X1 and a part of one Y electrode Y1. The lattice unit region 111 defining a lattice unit 110 further includes one X floating electrode FX facing the X electrode X1 and one Y floating electrode FY facing the Y electrode Y1 in the planar view. Each X floating electrode FX and each Y floating electrode FY are included in one lattice unit region 111. The pattern formed of an X electrode, a Y electrode, an X floating electrode, and a Y floating electrode in a lattice unit region 111 is common to the touch panel 100.

The lattice unit 110 in FIG. 1C is a basic lattice unit. In other words, this basic lattice unit 110 is the lattice unit having the smallest area among the lattice units. The lattice unit region 111 is a basic lattice unit region. In other words, the basic lattice unit region of the touch panel in FIG. 1C includes one X floating electrode FX facing the X electrode X1 and one Y floating electrode FY facing the Y electrode Y1 that is different from the X floating electrode FX.

Within the lattice unit region 111, the area of the X electrode X1 is smaller than the area of the X floating electrode FX. The area of the Y electrode Y1 is smaller than the area of the Y floating electrode FY. In each lattice unit region 111, the area of the X electrode is smaller than the area of the X floating electrode and the area of the Y electrode is smaller than the area of the Y floating electrode. The number of X electrodes, the number of Y electrodes, the number of X floating electrodes, and the number of Y floating electrodes included in one lattice unit region are changed depending on the configuration of the lattice unit.

Figure 1D:
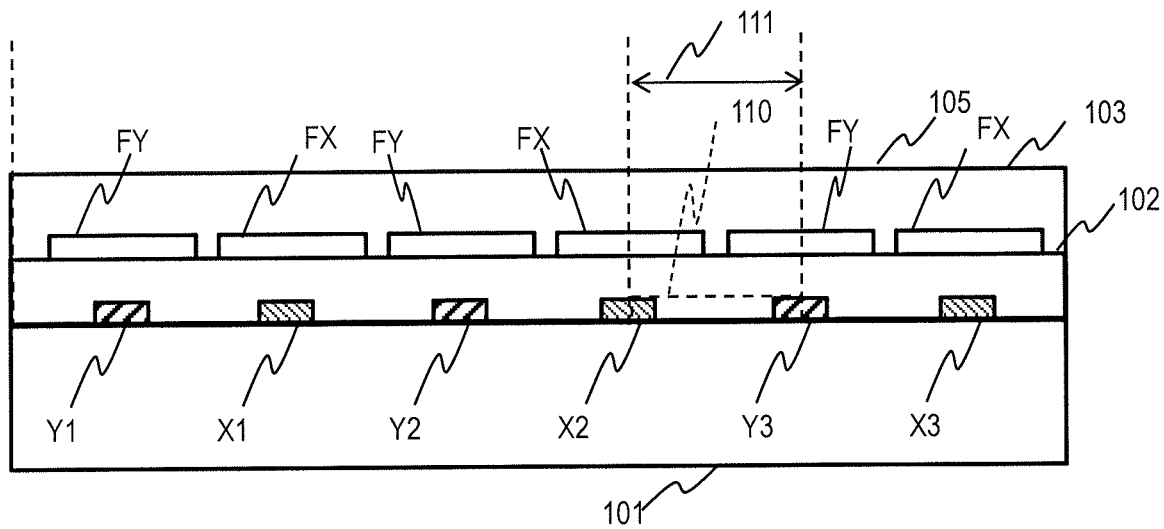
FIG. 1D schematically illustrates a cross-sectional structure of the touch panel cut along the line B-B in FIG. 1A.
Figure 1E:
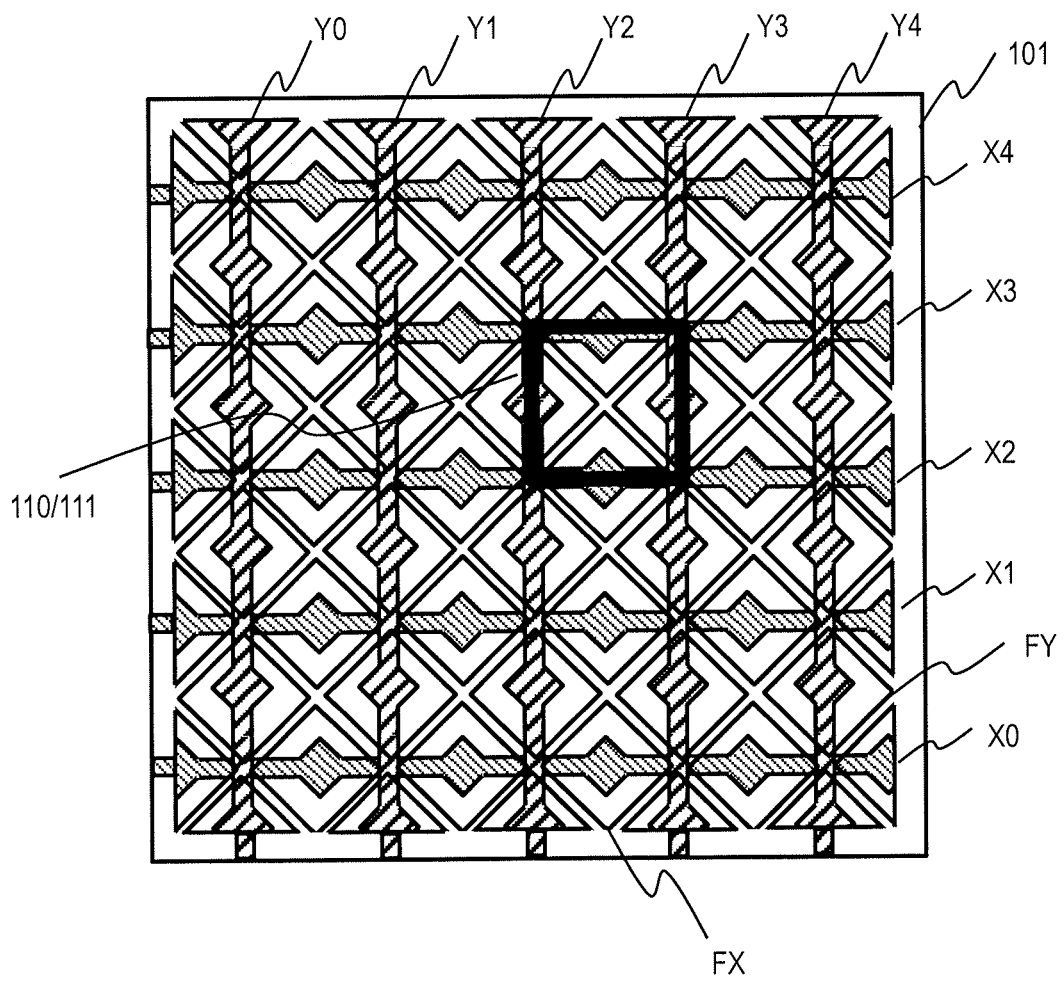
FIG. 1E is a plan diagram schematically illustrating the touch panel.

FIGS. 1D and 1E illustrate another configuration example of the lattice unit. FIG. 1D schematically illustrates a cross-sectional structure of the touch panel 100 cut along the line B-B in FIG. 1A. FIG. 1E is a plan diagram schematically illustrating the touch panel 100. In the example of FIGS. 1D and 1E, the lattice unit 110 (lattice unit region 111) has a square shape in a planar view and includes parts of two X electrodes X2 and X3 and parts of two Y electrodes Y2 and Y3.

The lattice unit region 111 defining the lattice unit 110 further includes a part of one X floating electrode FX facing the X electrode X2 and a part of one X floating electrode FX facing the X electrode X3, a part of one Y floating electrode FY facing the Y electrode Y2, and a part of one Y floating electrode FY facing the Y electrode Y3 in the planar view. The pattern formed of X electrodes, Y electrodes, X floating electrodes, and Y floating electrodes in a lattice unit region 111 is common to the touch panel 100.

The lattice unit 110 in FIG. 1E is a basic lattice unit. In other words, this basic lattice unit 110 is the lattice unit having the smallest area among the lattice units. The lattice unit region 111 is a basic lattice unit region. The basic lattice unit region of the touch panel in FIG. 1E includes two halves of X floating electrodes and two halves of Y floating electrodes. In other words, the basic lattice unit region of the touch panel in FIG. 1E includes parts of X floating electrodes having an area equal to the area of one whole X floating electrode and parts of Y floating electrodes having an area equal to the area of one whole Y floating electrode.

The touch panel 100 works as a projected capacitive touch panel employing mutual capacitance sensing scheme. When a pointer touches the touch surface 105 of the touch panel 100, the mutual capacitance generated between the X electrode and the Y electrode opposed to the pointer (located under the pointer) decreases. As will be described later, this decrease enables accurate detection of actual touch points even if two points are touched together.

The X floating electrodes FX and the Y floating electrodes FY in this configuration make the mutual capacitance between an X electrode and a Y electrode decrease in response to a touch of a pointer and allow thinning the insulating layers 102 and 103. Hereinafter, the functions of the X floating electrodes FX and the Y floating electrodes FY in this configuration are described in comparison with a comparative example.

Figure 2A:
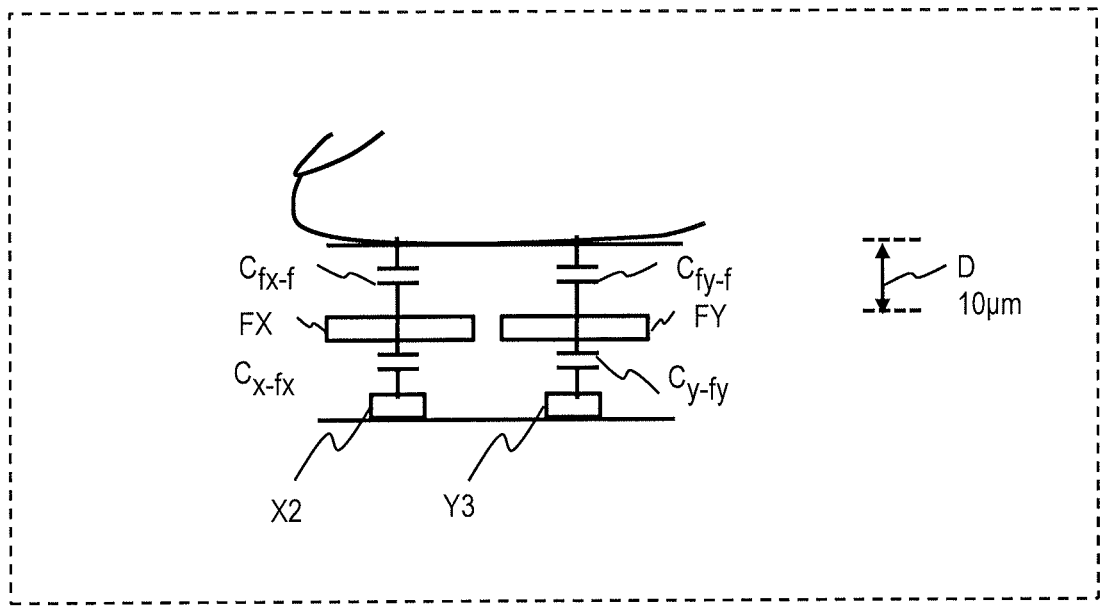
FIG. 2A schematically illustrates a circuit model of a touch panel including X floating electrodes and Y floating electrodes.
Figure 2B:
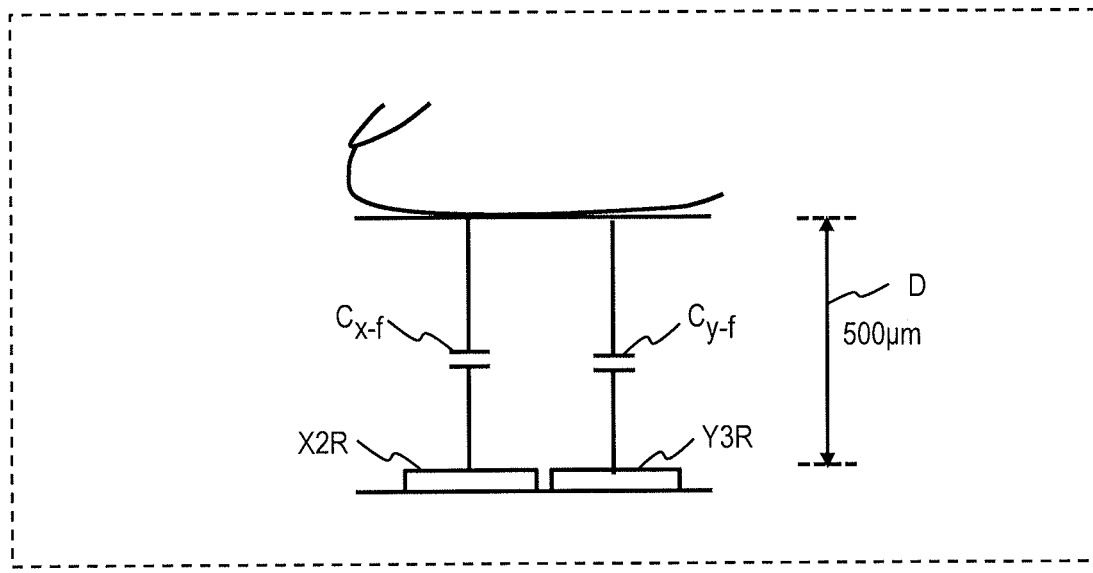
FIG. 2B illustrates a circuit model of a touch panel of a comparative example which does not include X floating electrodes and Y floating electrodes.

FIG. 2A schematically illustrates a circuit model of the touch panel 100 in this embodiment which includes X floating electrodes FX and Y floating electrodes FY. The floating electrodes are electrically floating electrodes that are not supplied with a specific potential. FIG. 2B illustrates a circuit model of a touch panel of a comparative example which does not include X floating electrodes FX and Y floating electrodes FY. In the following description, the pointer is assumed to be a finger.

In the configuration example of this embodiment in FIG. 2A, a capacitance $C_{x-fx}$ exists between the X electrode X2 and the X floating electrode FX; a capacitance $C_{fx-f}$ exists between the X floating electrode FX and the finger; a capacitance $C_{y-fy}$ exists between the Y electrode Y3 and the Y floating electrode FY; and a capacitance $C_{fy-f}$ exists between the Y floating electrode FY and the finger.

The thickness D of the insulating layer 103 provided over the X floating electrode FX and Y floating electrode FY (between the top faces of the floating electrodes and the finger) is 10 µm, for example. The thickness of the insulating layer 102 provided under the X floating electrode FX and Y floating electrode FY (between the underfaces of the floating electrodes and the top faces of the X electrode X2 and the Y electrode Y3) is also 10 µm, for example.

In the comparative example illustrated in FIG. 2B, a capacitance $C_{x-f}$ exists between the X electrode X2R and the finger and a capacitance $C_{y-f}$ exists between the Y electrode Y3R and the finger. The thickness D of the insulating layer over the X electrode X2R and the Y electrode Y3R is 500 µm, for example.

In the configuration examples in FIGS. 2A and 2B, the X electrode can be a driver electrode and the Y electrode can be a receiver electrode. The mutual capacitance generated by the X electrode and the Y electrode decreases in response to a touch of the pointer in both configurations in FIGS. 2A and 2B.

The insulating film thickness D in this embodiment in FIG. 2A is much smaller than the insulating film thickness in the comparative example in FIG. 2B. If the insulating film thickness D in the comparative example is decreased, the capacitance between the X electrode and the Y electrode increases in response to a touch. In the configuration where a touch increases the mutual capacitance between an X electrode and a Y electrode, a ghost occurs in response to two-point touches. The ghost is a phenomenon that the mutual capacitance increases at a point different from the actual touch point. This problem of the comparative example is described with reference to FIGS. 3A, 3B, and 4.

Figure 3A:
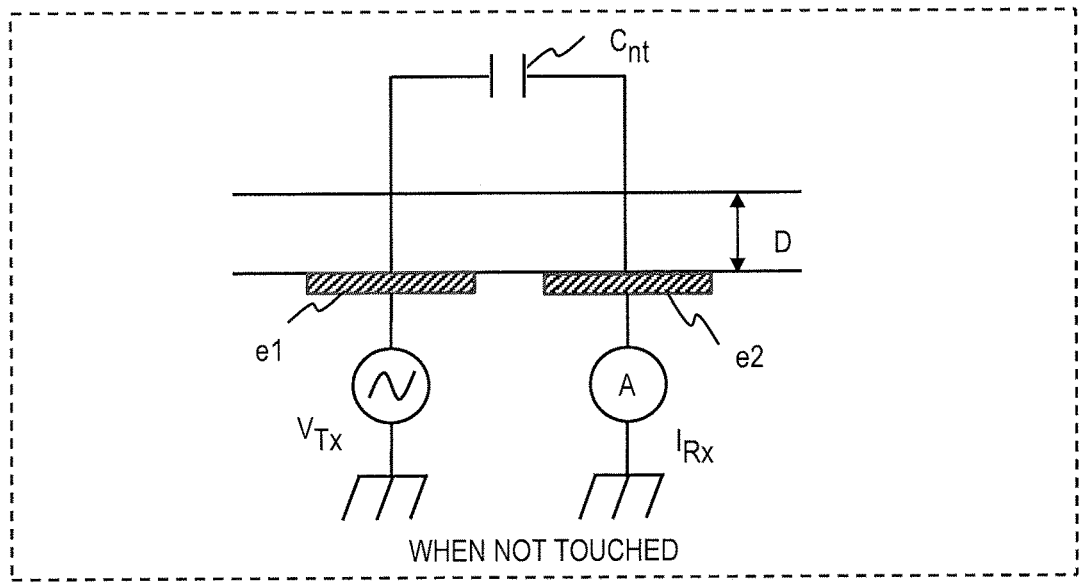
FIG. 3A schematically illustrates an equivalent circuit to the comparative example in FIG. 2B when not touched.
Figure 3B:
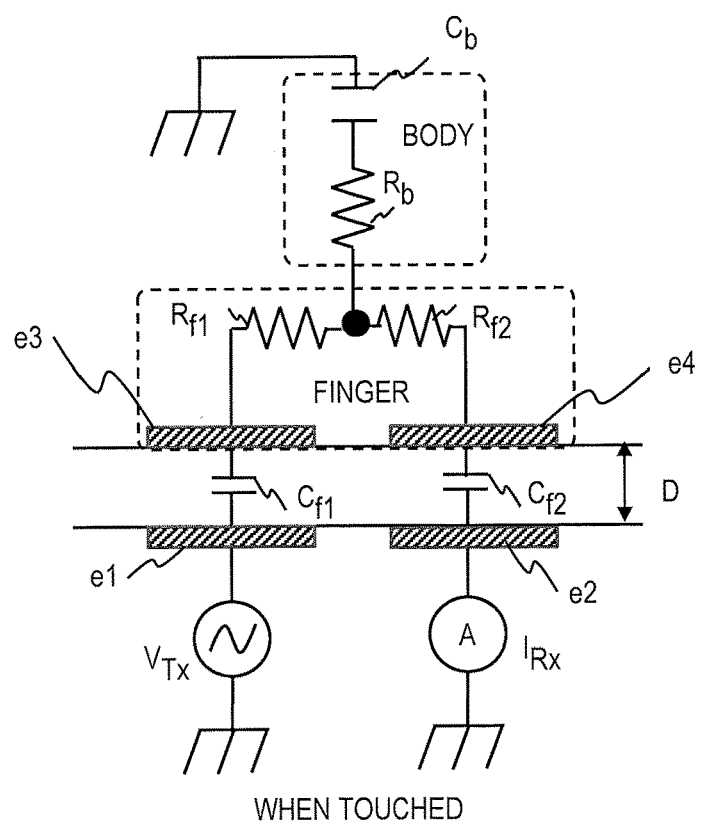
FIG. 3B schematically illustrates the equivalent circuit to the comparative example in FIG. 2B when touched.

FIGS. 3A and 3B schematically illustrate equivalent circuits to the comparative example in FIG. 2B. FIG. 3A represents the circuit when the touch panel is not touched by a finger and FIG. 3B represents the circuit when the touch panel is touched by a finger. With reference to FIG. 3A, the electrodes e1 and e2 are the X electrode X2R and the Y electrode Y3R, respectively. A capacitance $C_{nt}$ exists between the electrodes e1 and e2. The driver electrode e1 is supplied with a driving voltage $V_{Tx}$. The signal current measured at the receiver electrode e2 is $I_{Rx}$.

With reference to FIG. 3B, a finger is represented by a circuit consisting of electrodes e3 and e4 and resistors $R_{f1}$ and $R_{f2}$. A human body has a resistance $R_b$ and a capacitance $C_b$. A capacitance $C_{f1}$ exists between the driver electrode e1 and the electrode e3 in the finger and a capacitance $C_{f2}$ exists between the receiver electrode e2 and the electrode e4 in the finger. The values of the capacitances $C_{f1}$ and $C_{f2}$ can be the same.

Figure 4:
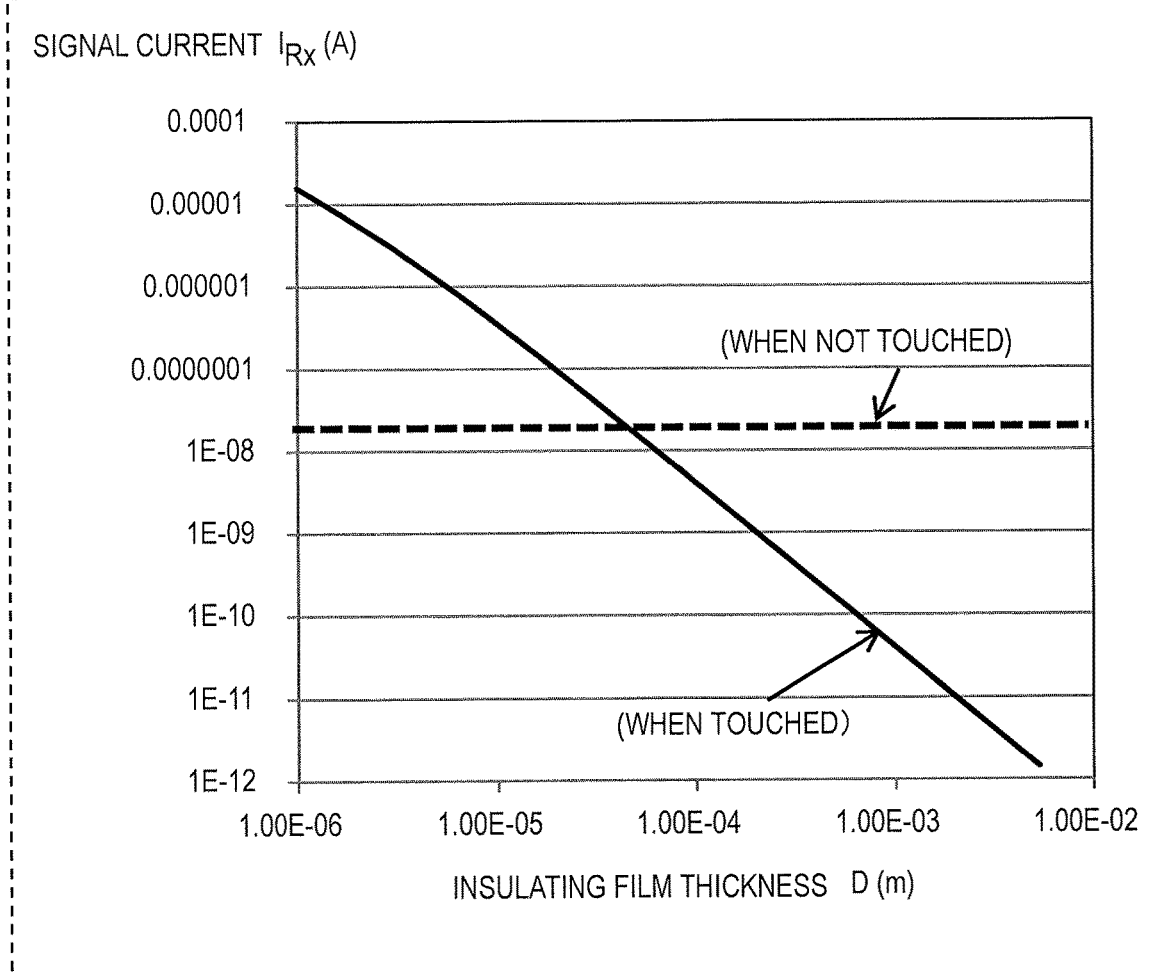
FIG. 4 provides calculation results about the relation between the insulating film thickness and the signal current at the receiver electrode in the models illustrated in FIGS. 3A and 3B.

FIG. 4 provides calculation results about the relation between the insulating film thickness D and the signal current $I_{Rx}$ at the receiver electrode e2 in the models illustrated in FIGS. 3A and 3B. This calculation assumes that the driving voltage $V_{Tx}$ is a sign wave of 1 V and 100 kHz, the electrodes e1, e2, e3, and e4 are 3-mm square conductors, and the distance between the electrodes e1 and e2 in the circuit is 3 mm. The calculation further assumes that the body capacitance $C_b$ is 100 pF, the body resistance $R_b$ is 1.5 kΩ, and each of the resistances $R_{f1}$ and $R_{f2}$ at the fingertip is 25Ω.

As indicated in FIG. 4, when the insulating film thickness D between the electrodes and the finger is less than 50 µm, the signal current to be detected increases, in other words, the mutual capacitance between the X electrode and the Y electrode increases, in response to a touch. For the comparative example in FIG. 2B that does not have floating electrodes, the insulating film thickness D needs to be 50 µm or more to detect two touch points correctly.

The models in FIGS. 3A and 3B indicate that whether the variation in mutual capacitance (or $\Delta C$) caused by a touch is positive or negative depends on the relation of the impedances of the capacitances $C_f$ between the finger and the electrodes e1 and e2 to the impedance of the body.

The capacitances $C_{f1}$ and $C_{f2}$ between the finger and the electrodes e1 and e2 can be reduced to make their impedances higher than the impedance of the body by increasing the insulating film thickness D. Considering an extreme example, when the impedances of the capacitances $C_{f1}$ and $C_{f2}$ are sufficiently higher than the impedance of the body, the impedance of the body can be regarded as zero. In that case, the potential at the midpoint between the resistors $R_{f1}$ and $R_{f2}$ of the finger is fixed at the ground and the signal current $I_{Rx}$ does not flow. Accordingly, a touch decreases the signal current $I_{Rx}$ or decreases the mutual capacitance between the X electrode and the Y electrode.

Conversely, when the insulating film thickness D is reduced, the capacitances $C_{f1}$ and $C_{f2}$ between the finger and the electrodes e1 and e2 become larger, so that their impedances become lower than the impedance of the body. In an extreme example, the impedance of the body can be regarded as infinity. Insertion of the electrodes e3 and e4 of the finger increases the capacitance between the electrodes e1 and e2 and the signal current $I_{Rx}$ at the receiver electrode e2 increases. In this way, a touch increases the signal current $I_{Rx}$, or increases the mutual capacitance between the X electrode and the Y electrode.

The cause of a ghost is discussed. When the impedance of the body is regarded as infinity, the potential of FINGER in FIG. 3B is ½ of the potential of the voltage source $V_{Tx}$. Since the voltage source $V_{Tx}$ outputs AC voltage, pulse voltage, or step voltage, the potential of FINGER oscillates with a ½ amplitude of the amplitude of the voltage output from $V_{Tx}$. Since the impedance of the body is infinity, the potential of the hand in contact with the electrode e1 becomes close to ½ of the potential of $V_{Tx}$.

Then, the potentials of the fingers other than the finger in contact with the electrode e1 also become close to ½ of the potential of $V_{Tx}$. In the case of two-point touches, the potential of the finger other than the finger in contact with the electrode e1 becomes close to ½ of the potential of $V_{Tx}$ and accordingly, current flows in the receiver electrode opposed to the finger other than the finger in contact with the electrode e1, so that the current $I_{Rx}$ observed at the ammeter connected with the receiver electrode increases.

In the case where the insulating film thickness D is large, the impedance of the body can be regarded as zero and therefore, the potentials of the finger in contact with the electrode e1 and the other finger are zero. For this reason, no current flows in the receiver electrode opposed to the finger other than the finger in contact with the electrode e1, so that the current $I_{Rx}$ observed at the ammeter connected with the receiver electrode does not change.

As described above, in the case where the impedances between an X electrode and a finger and between a Y electrode and the finger are large, the mutual capacitance decreases in response to a touch, allowing correct detection of a touch point in two-point touches. To keep the impedances between an X electrode and a finger and between a Y electrode and the finger at large values and moreover, to reduce the insulating film thickness D, the X electrode and the Y electrode need to be small. As a result, even if the insulating film thickness D is small, small capacitances and high impedances are attained between the X electrode and a finger and between the Y electrode and the finger.

However, reducing the sizes of the X electrodes and the Y electrodes may lower the accuracy in detecting a touch point. The touch panel 100 in this disclosure includes X floating electrodes FX and Y floating electrodes FY and further, has a lattice unit region in which the area of X floating electrode(s) is larger than the area of X electrode(s) and the area of Y floating electrode(s) is larger than the area of Y electrode(s).

As a result, the variation in signal current caused by a touch or the sensitivity increases. In other words, the variation in mutual capacitance between an X electrode and a Y electrode caused by a touch or the sensitivity increases, allowing detection of an accurate touch point. Particularly in a configuration where the insulating film thickness D between the X and Y electrodes and the finger is less than 50 µm, the touch panel 100 can accurately detect a touch point.

Figure 5A:
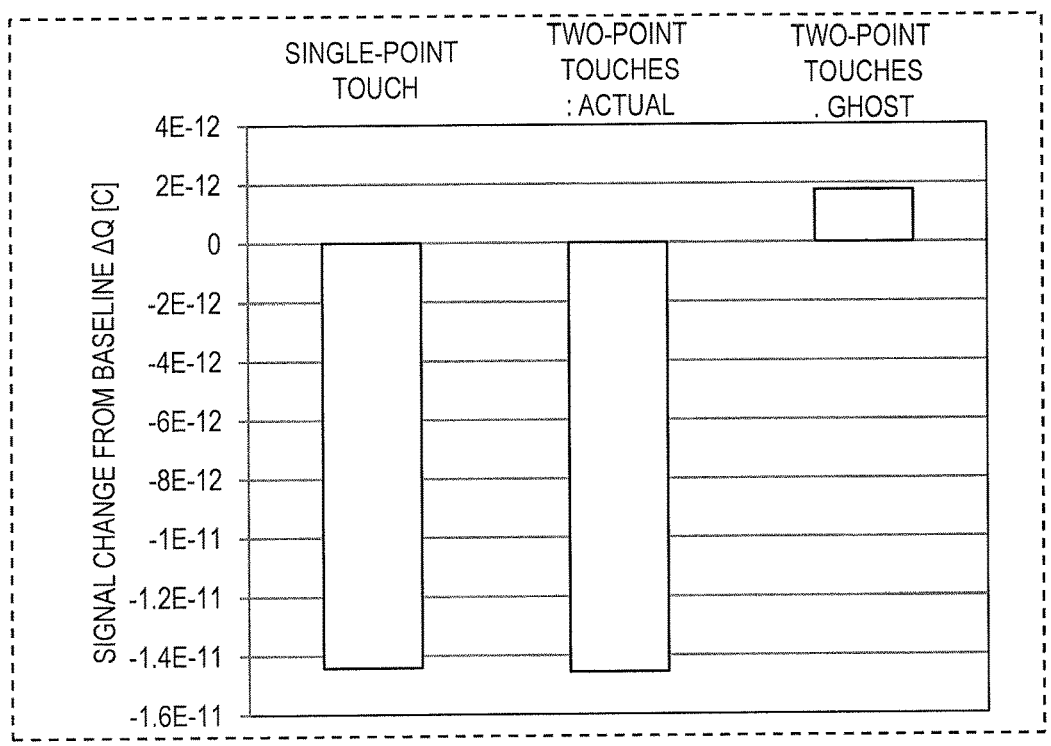
FIG. 5A provides a change in charge amount at the touch point in a single-point touch, a change in charge amount at one actual touch point in two-point touches, and a change in charge amount at a ghost point in the two-point touches.
Figure 5B:
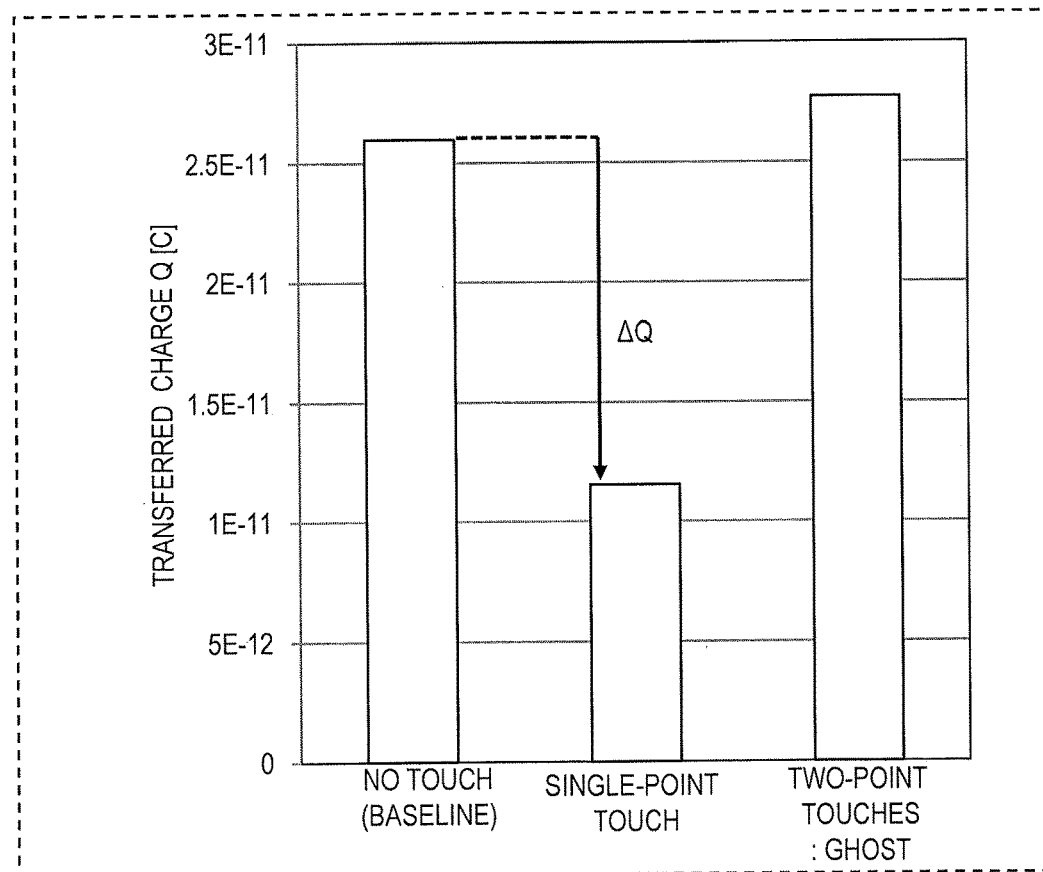
FIG. 5B provides charge amounts at a point when the touch panel is not touched, the touch point in a single-point touch, and a ghost point.

FIGS. 5A and 5B provide simulation results on the touch panel 100 including floating electrodes in this disclosure. The X floating electrodes and the Y floating electrodes have a square shape having sides of substantially 1200 µm. The gap between floating electrodes is substantially 10 µm. The pitch of the X electrodes and the pitch of the Y electrodes are 1700 µm. The first insulating layer 102 is an acrylic layer having a thickness of substantially 10 µm. The second insulating layer 103 is composed of a lower acrylic layer and an upper hard coat layer; the acrylic layer has a thickness of substantially 2 µm and the hard coat layer has a thickness of substantially 10 µm. The driving signal has an amplitude of 10 V and a frequency of 100 kHz.

FIG. 5A provides a change in charge amount at the touch point in a single-point touch, a change in charge amount at one actual touch point in two-point touches, and a change in charge amount at a ghost point in the two-point touches. The ghost point is the point where the X electrode for one actual touch point intersects with the Y electrode for the other actual touch point.

As indicated in FIG. 5A, the single-point touch decreases the charge amount (signal current) at the touch point. In similar, the two-point touches decrease the charge amount (signal current) at each of the two touch points. The changes in charge amount (signal current) are substantially the same between the single-point touch and the two-point touches. The charge amount (signal current) is increased a ghost point in two-point touches. As noted from FIG. 5A, the touch panel including floating electrodes in this disclosure can correctly detect touch points of two-point touches, even though the touch panel has a thin surface insulating film.

Figure 5C:
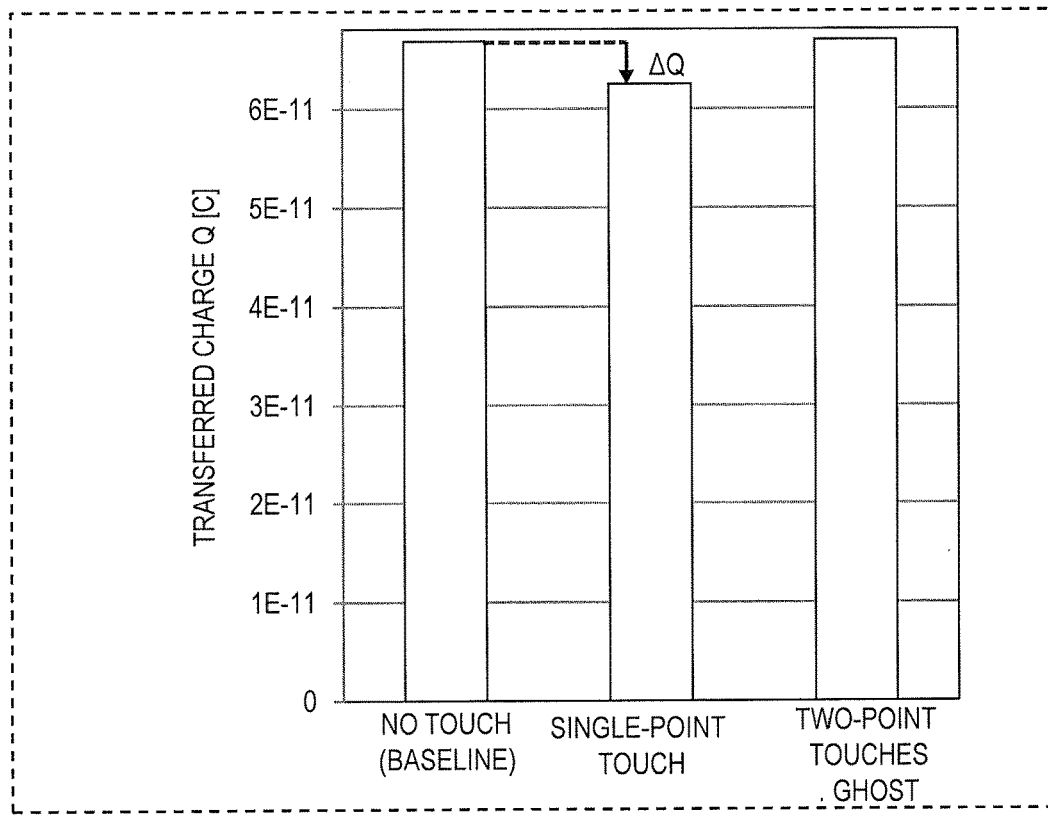
FIG. 5C provides results of the same simulations as FIG. 5B on the comparative example in FIG. 2B.

FIG. 5B provides charge amounts Q at a point when the touch panel is not touched, the touch point in a single-point touch, and a ghost point. FIG. 5B further provides a variation Δ Q in charge amount caused by the single-point touch from the charge amount at no touch. FIG. 5C provides results of the same simulation on the comparative example illustrated in FIG. 2B.

As indicated in FIGS. 5B and 5C, the charge amount Q decreases in response to a single-point touch and the charge amount at a ghost point increases. As understood from the comparison of FIG. 5B with FIG. 5C, the rate of the variation Δ Q in charge amount caused by a touch to the charge amount Q at no touch is large in the touch panel 100 in this disclosure, compared to the comparative example. This means that the variation Δ Q in the touch panel 100 in this disclosure accounts for a larger proportion of the dynamic range of the signal current measurement. For this reason, the S/N ratio improves.

Figure 5D:
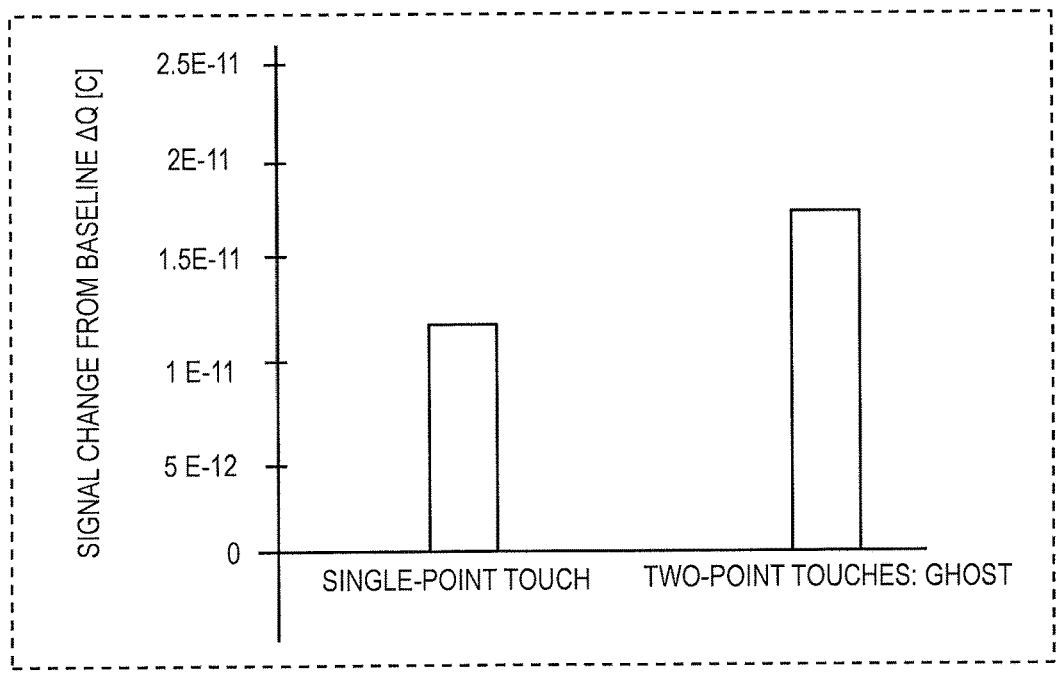
FIG. 5D provides experiment results about the change in charge amount on a structure such that the comparative example in FIG. 2B has a thinner insulating layer.

FIG. 5D provides experiment results about the change in charge amount on a structure such that the comparative example in FIG. 2B has a thinner insulating layer (D=10 µm). Specifically, FIG. 5D provides a change in charge amount at the touch point in a single-point touch and a change in charge amount at a ghost point in two-point touches. A single-point touch increases the mutual capacitance at the touch point, so that the signal charge amount increases. On the other hand, the signal charge amount at the ghost point also increases.

As noted from FIG. 5D, when the insulating film thickness D in the comparative example is decreased, the capacitance between an X electrode and a Y electrode increases in response to a touch. In the case where the mutual capacitance between an X electrode and a Y electrode increases in response to a touch, a ghost occurs in response to two-point touches. The ghost is a phenomenon that the mutual capacitance increases at a point different from the actual touch point. The signal charge amounts are almost the same between in the cases of an actual touch and a ghost touch; the actual touch cannot be distinguished from the ghost touch with a threshold.

Figure 6A:
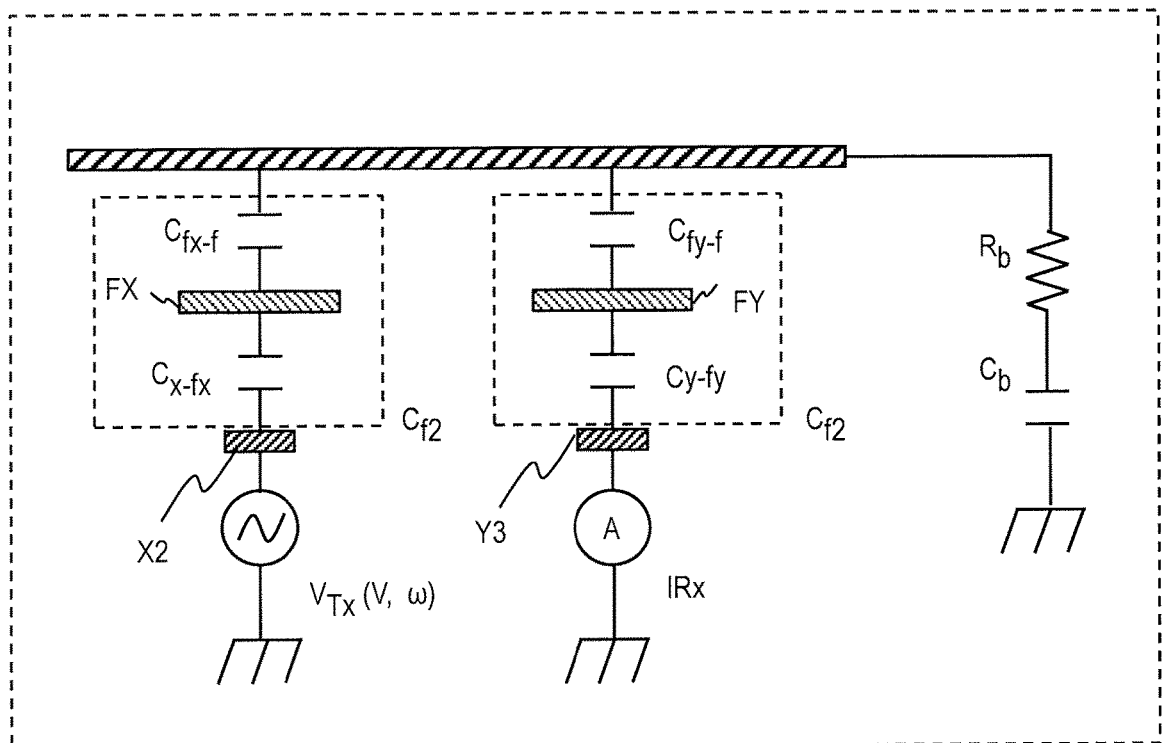
FIG. 6A schematically illustrates a circuit model of the configuration example in FIG. 2A when a finger is in contact with the touch panel.
Figure 6B:
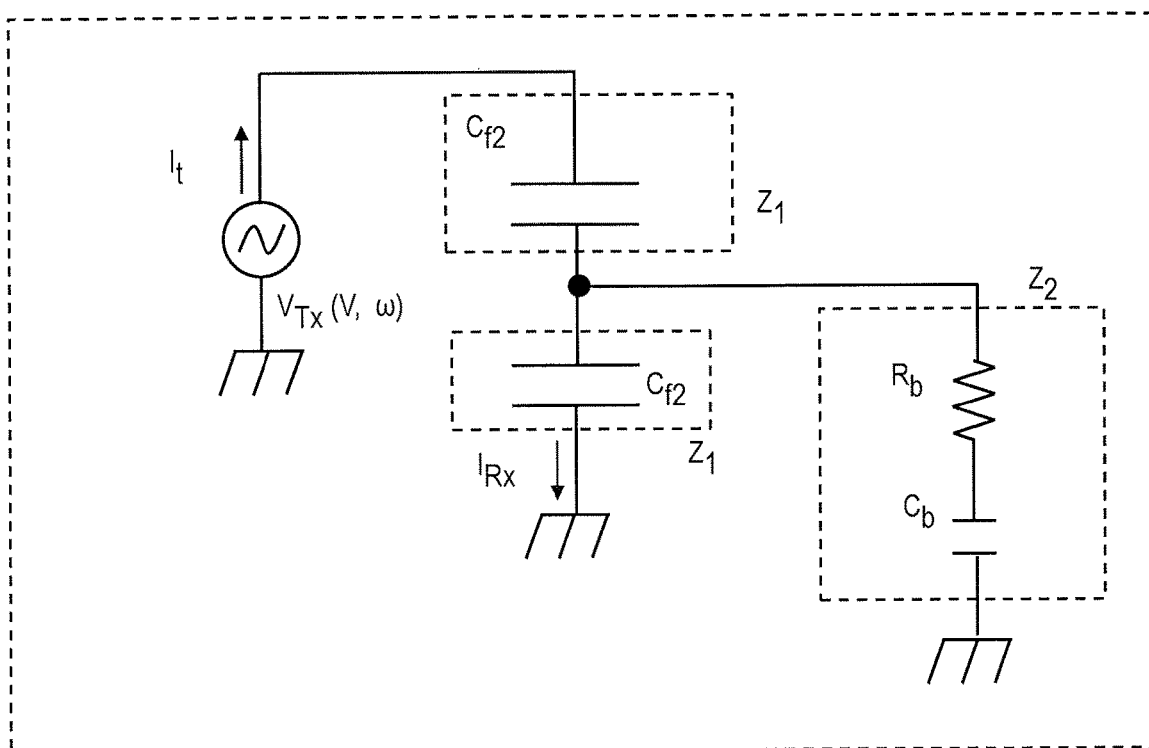
FIG. 6B schematically illustrates an equivalent circuit to the model in FIG. 6A.

Hereinafter, the configuration of the touch panel 100 in this disclosure is described with formulae. The following description uses the configuration example in FIG. 2A. FIG. 6A schematically illustrates a circuit model of the configuration example in FIG. 2A when a finger is in contact with the touch panel 100. FIG. 6B schematically illustrates an equivalent circuit to the model in FIG. 6A.

As indicated in FIGS. 6A and 6B, the voltage source $V_{Tx}$ has an amplitude of V and an angular frequency of $\omega$. Both the combined capacitance between the X electrode X2 and the finger and the combined capacitance between the Y electrode Y3 and the finger are denoted by $C_{f2}$. The values of these are the same. The impedance $Z_1$ between the X electrode X2 and the finger and the impedance $Z_1$ between the Y electrode Y3 and the finger are at the same value and are expressed by the following formula:

$$Z_1 = \frac{1}{j\omega C_{f2}} \quad (1)$$

where j represents an imaginary number.

The finger and the body can be expressed by a specific circuit as described with reference to FIGS. 3A and 3B. Assume that the impedances of the resistances $R_{f1}$ and $R_{f2}$ of the finger are zero; then, the impedance $Z_2$ of the finger and the body can be expressed by the following formula:

$$Z_2 = R_b + \frac{1}{j\omega C_b} \quad (2)$$

The combined impedance $Z_t$ of the circuit in FIG. 6B with respect to the voltage source $V_{Tx}$ can be expressed by the following formula:

$$Z_t = Z_1 + \frac{Z_1 Z_2}{Z_1 + Z_2} \quad (3)$$

The total current $I_t$ in the circuit in FIG. 6B can be expressed by the following formula:

$$I_t = \frac{V}{Z_t} \quad (4)$$

Accordingly, the signal current $I_{Rt}$ is expressed by the following formula:

$$I_{Rx} = I_t \frac{Z_2}{Z_1 + Z_2} \quad (5)$$
$$= \frac{Z_2}{Z_1^2 + 2Z_1 Z_2} V$$

Letting $C_{nt}$ be the capacitance between the X electrode X2 and the Y electrode Y3 when the touch panel is not touched, the signal current $I_{nt}$ when the touch panel is not touched is expressed by the following formula:

$$I_{nt} = j\omega C_{nt} V \quad (6)$$

The phenomenon that the mutual capacitance decreases in response to a touch means that the condition expressed by the following formula is satisfied:

$$I_{Rx} < I_{nt} \quad (7)$$

That is to say, the following formula is established:

$$\left| \frac{Z_2}{Z_1^2 + 2Z_1 Z_2} \right| < |j\omega C_{nt}| \quad (8)$$

The following formula is obtained from Formula 8:

$$\left| \frac{Z_2}{Z_1^2 + 2Z_1 Z_2} \right|^2 < |j\omega C_{nt}|^2 \quad (9)$$

Further, the following formula is obtained using Formulae 1 and 2:

$$\frac{C_{f2}^4 (1 + \omega^2 C_b^2 R_b^2)}{(C_b + 2C_{f2})^2 + 4\omega^2 C_b^2 C_{f2}^2 R_b^2} < C_{nt}^2 \quad (10)$$

According to the human body model in Japanese Industrial Standards (JIS), $R_b$=1.5 kΩ and $C_b$=100 pF. The typical driving frequency for a touch panel is 100 kHz; the angular frequency $\omega$ is $2\pi \times 100 \times 10^3$ rad/sec. Accordingly, the impedance $Z_2$ can be calculated as follows:

$$Z_2 = 1.5 k\Omega - j16 k\Omega \quad (11)$$

The impedance $Z_2$ can be approximated as $-j16$ kΩ. That is to say, $R_b$ can be approximated as 0. Defining that $Z_3 = 1/j\omega C_b$, the following formula is obtained by substituting $Z_2$ in Formula 8 with $Z_3$:

$$\left| \frac{Z_3}{Z_1^2 + 2Z_1 Z_3} \right| < |j\omega C_{nt}| \quad (12)$$

The following formula can be obtained by rewriting $Z_1$ and $Z_3$ in Formula 12 into $1/(j\omega C_{f2})$ and $1/j\omega C_b$, respectively:

$$\left| j\omega \frac{C_{f2}^2}{C_b + 2C_{f2}} \right| < |j\omega C_{nt}| \quad (13)$$

$$\frac{C_{f2}^2}{C_b + 2C_{f2}} < C_{nt}$$

The following formula is obtained from Formula 13:

$$C_{nt} - \sqrt{C_{nt}} \sqrt{C_b + C_{nt}} < C_{f2} < C_{nt} + \sqrt{C_{nt}} \sqrt{C_b + C_{nt}} \quad (14)$$

In Formula 14, $(C_{nt} - (C_{nt})^{1/2}(C_b + C_{nt})^{1/2})$ takes a negative value. Accordingly, the following formula is obtained:

$$(0) < C_{f2} < C_{nt} + \sqrt{C_{nt}^2 + C_{nt} C_b} \quad (15)$$

Examples of the values for the variables used in the above formulae are provided and described based on an embodiment. The touch panel in this embodiment generally has the same configuration as the one illustrated in FIGS. 1A and 1B. When the touch panel in this embodiment is viewed planarly, the X floating electrodes FX and the Y floating electrodes FY are squares having sides of 1180 μm and the gap between an X floating electrode FX and a Y floating electrode FY adjacent to each other is 9 μm. The pitch $P_{XE}$ of the X electrodes and the pitch $P_{YE}$ of the Y electrodes are both 1680 μm.

Each X electrode has a shape such that rhombic units are connected by a strip-like connector into a string; each rhombic unit is a square having sides of 230 μm and the width of the strip-like connector is 50 μm. Each Y electrode has a shape such that rhombic units are connected by a strip-like connector into a string; each rhombic unit is a square having sides of 230 μm and the width of the strip-like connector is 50 μm.

The first insulating layer 102 is an acrylic layer having a dielectric constant of 3 and a thickness of substantially 10 μm. The second insulating layer 103 is composed of a lower acrylic layer and an upper hard coat layer. The acrylic layer has a dielectric constant of 3 and a thickness of substantially 1.5 μm; the hard coat layer has a dielectric constant of 5.3 and a thickness of substantially 10 μm. The driving signal has a frequency of 100 kHz.

Referring to FIG. 2A based on this configuration example, the value of the capacitance $C_{x\text{-}fx}$ between the X electrode and one X floating electrode FX is 0.5 pF and the value of the capacitance $C_{fx\text{-}f}$ between the X floating electrode FX and the finger is 5.2 pF. Further, the value of the capacitance $C_{y\text{-}fy}$ between the Y electrode and one Y floating electrode FY is 0.5 pF and the value of the capacitance $C_{fy\text{-}f}$ between the Y floating electrode FY and the finger is 5.2 pF.

Referring to FIG. 6A, the capacitance $C_{f2}$ between the finger and the X electrode with one X floating electrode interposed therebetween is the capacitance obtained by connecting the capacitances $C_{x\text{-}fx}$ and $C_{fx\text{-}f}$ in series and the value thereof is 0.456 pF. The value of the capacitance between the finger and the Y electrode with one Y floating electrode interposed therebetween is the same 0.456 pF and denoted by the same reference sign $C_{f2}$. When the touch panel is not touched by a finger, a mutual capacitance is generated between the X electrode and the Y electrode with the X floating electrode and the Y floating electrode; the mutual capacitance at the intersection of the X electrode and the Y electrode is denoted by $C_{nt}$ and the value thereof is 0.288 pF. This value is obtained by measurement or three-dimensional capacitance simulation.

Assuming that $R_b$=1.5 kΩ and $C_b$=100 pF in accordance with the human body model and assigning the foregoing values to Formula 8, the left side value of Formula 8 is 1.31×10$^{-9}$ siemens and the right side value of Formula 8 is 1.81×10$^{-7}$ siemens. Accordingly, this embodiment satisfies Formula 8. Using $R_b$=1.5 kΩ and $C_b$=100 pF, Formula 8 can be expressed as follows:

$$\left| \frac{500(-2j \times 10^7 + 3\omega)}{Z_1\{-2j \times 10^{10} + \omega(3000 + Z_1)\}} \right| < |j\omega C_{nt}| \tag{16}$$

The left side value of Formula 10 is 4.28×10$^{-30}$ F$^2$ and the right side value of Formula 10 is 8.32×10$^{-26}$ F$^2$ and accordingly, this embodiment satisfies Formula 10. Using $R_b$=1.5 kΩ and $C_b$=100 pF, Formula 10 can be expressed as follows:

$$\frac{C_{f2}^4 (1 + 2.25 \times 10^{-14} \times \omega^2)}{(1 \times 10^{-10} + 2C_{f2})^2 + 9 \times 10^{-14} \times C_{f2}^2 \omega^2} < C_{nt}^2 \tag{17}$$

The value of $C_{f2}$ in Formula 15 is 4.56×10$^{-13}$ and the right side value of Formula 15 is 5.66×10$^{-12}$ F and accordingly, this embodiment satisfies Formula 15. Using $R_b$=1.5 kΩ and $C_b$=100 pF, Formula 15 can be expressed as follows:

$$C_{f2} < C_{nt} + \sqrt{C_{nt}^2 + C_{nt} \times 10^{-10}} \tag{18}$$

Hereinafter, a method of controlling the touch panel 100 is described. In the example described hereinafter, the touch panel 100 also functions as a tactile panel. The tactile panel provides a texture to a finger using the electrostatic force vibrating at a predetermined frequency that is generated between an X electrode and a Y electrode.

That is to say, the X electrodes and the Y electrodes are used to provide a texture as well as to detect a touch point. The control of the touch panel 100 locates a touch point on the touch surface 105 and further, provides a texture to the finger when the user touches the touch surface 105. Hereinafter, the touch panel 100 that functions as a tactile panel is also referred to as tactile touch panel. The touch panel 100 can be used only to detect a touch point.

The touch panel 100 includes X floating electrodes and Y floating electrodes in addition to the X electrodes and the Y electrodes. As described above, the area of the X floating electrode(s) is larger than the area of the X electrode(s) and the area of the Y floating electrode(s) is larger than the area of the Y electrode(s) in a lattice unit region. The touch panel 100 in this embodiment distinguishes an actual touch point and a ghost point in two-point touches to accurately locate two touch points, even though the insulating layer 102 covering the X floating electrodes and the Y floating electrodes is thin.

The touch panel 100 in this embodiment is configured so that the distance from the finger to the X floating electrodes and the Y floating electrodes is short and the X floating electrodes and the Y floating electrodes to be opposed to a finger are larger than the X electrodes and the Y electrodes. Accordingly, a large electrostatic force that can present a strong texture is generated between the finger and the X and Y floating electrodes.

Figure 7:
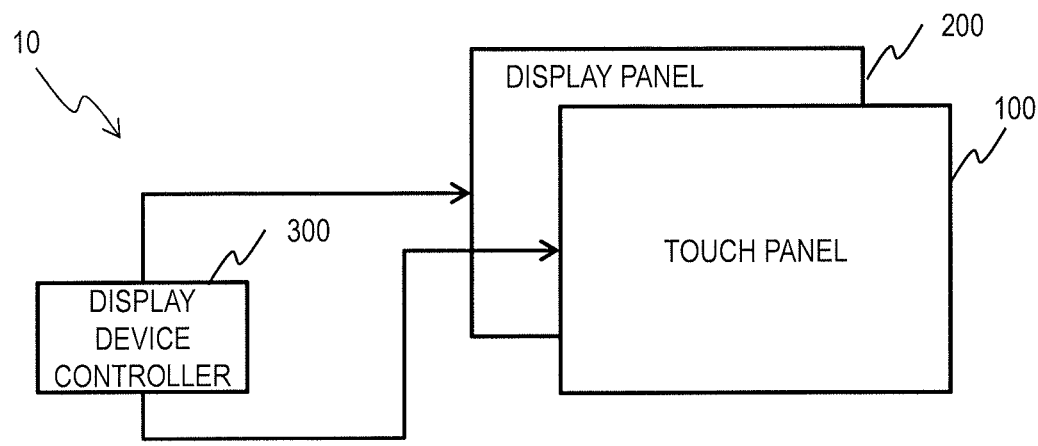
FIG. 7 schematically illustrates a configuration example of a display device.

FIG. 7 schematically illustrates a configuration example of a display device 10. The display device 10 includes a display panel 200 for displaying an image, a touch panel 100 disposed in front of (on the user side of) the display panel 200, and a display device controller 300 connected with the display panel 200 and the touch panel 100 to control them.

The display panel 200 can be a liquid crystal display panel or an organic light-emitting diode (OLED) display panel, for example. The display device controller 300 controls the display panel 200 based on the image data input from the external to display an image. The display device controller 300 controls the touch panel 100 to detect a touch point of a finger on the touch panel 100. The display device controller 300 controls the touch panel 100 to present a texture in the area corresponding to a button, for example, displayed on the display panel 200.

The display device controller 300 includes a processor, a memory, a storage, and an interface with the external, for example. These components are interconnected by internal lines. The processor operates in accordance with a program stored in the memory to implement predetermined functions. The program to be executed and the data to be referenced by the processor can be loaded from the storage to the memory. The display device controller 300 may include a logical circuit for implementing a predetermined function in addition to or in place of the processor.

Figure 8:
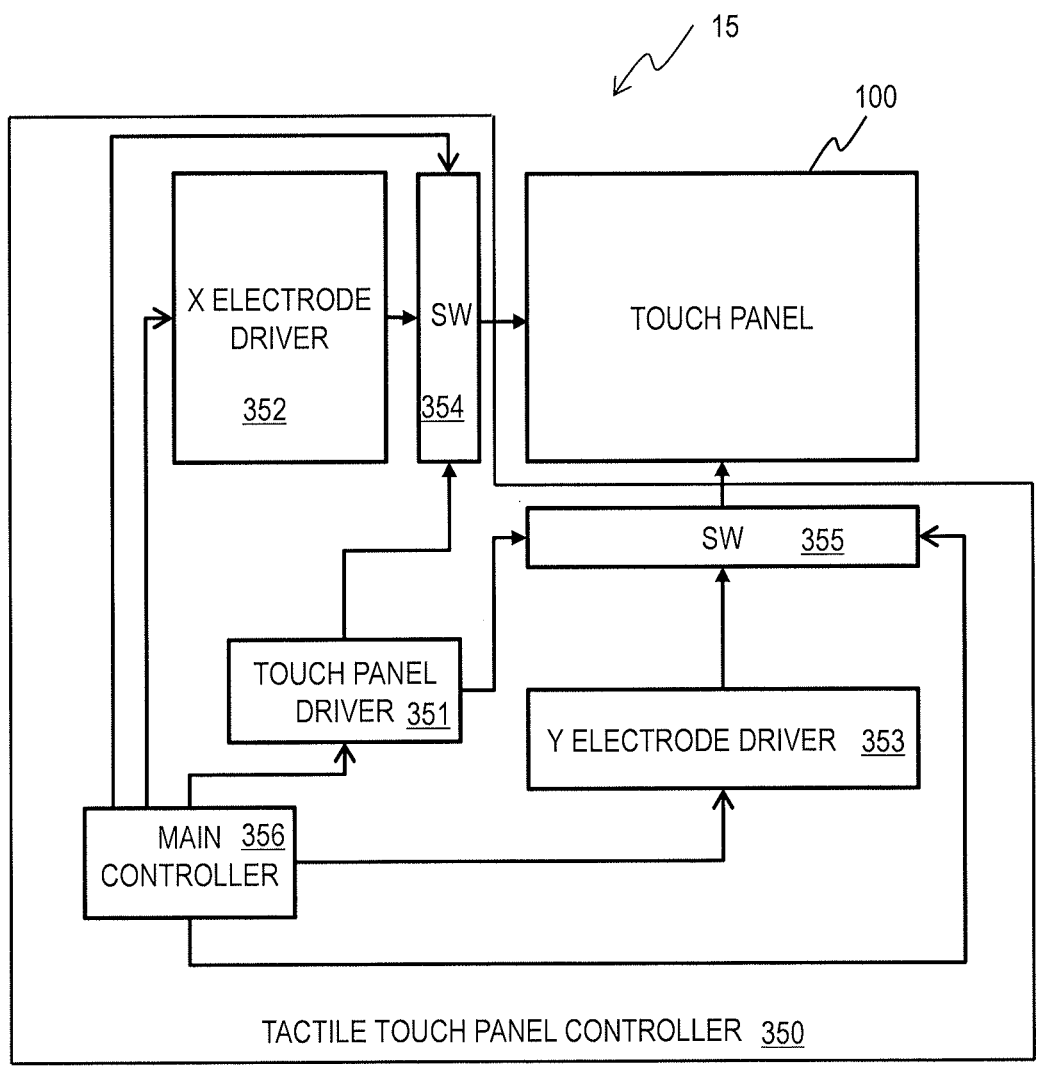
FIG. 8 schematically illustrates a logical configuration of a tactile touch panel device included in a display device.

FIG. 8 schematically illustrates an example of the logical configuration of a tactile touch panel device 15 included in the display device 10. The tactile touch panel device 15 includes a tactile touch panel 100 and a tactile touch panel controller 350 for controlling the tactile touch panel 100. The tactile touch panel controller 350 is a part of the display device controller 300.

The tactile touch panel controller 350 includes a touch panel driver 351. The touch panel driver 351 controls the operation of the X electrodes (in the example of FIG. 1A, the X electrodes X0 to X4) and the Y electrodes (in the example of FIG. 1A, the Y electrodes Y0 to Y4) to detect a contact of an object onto the touch surface 105. The touch panel driver 351 is a circuit to implement the functions of the touch panel to detect a touch of a pointer onto the touch surface 105 using the X electrodes and the Y electrodes.

The tactile touch panel controller 350 includes an X electrode driver 352 for controlling the operation of the X electrodes to present a texture on the touch surface 105 and a Y electrode driver 353 for controlling the operation of the Y electrodes to present a texture on the touch surface 105. The X electrode driver 352 and the Y electrode driver 353 are circuits to present a texture on the touch surface 105 using the X electrodes and the Y electrodes.

The tactile touch panel controller 350 includes a switch (SW) 354 connected with the plurality of X electrodes and a switch 355 connected with the plurality of Y electrodes. The switch 354 is capable of connecting a part of the X electrodes to the touch panel driver 351 and the other X electrodes to the X electrode driver 352 and further, capable of switching the connection of each X electrode between the touch panel driver 351 and the X electrode driver 352. The switch 355 is capable of connecting a part of the Y electrodes to the touch panel driver 351 and the other Y electrodes to the Y electrode driver 353 and further, capable of switching the connection of each Y electrode between the touch panel driver 351 and the Y electrode driver 353.

The tactile touch panel controller 350 includes a main controller 356. The main controller 356 is connected with the touch panel driver 351, the X electrode driver 352, the Y electrode driver 353, and the switches 354 and 355. The main controller 356 receives a control signal from the external of the tactile touch panel controller 350 and controls the other components in the tactile touch panel controller 350.

The tactile touch panel device 15 presents a texture on the touch surface 105 in accordance with the operation of the X electrode driver 352 and the Y electrode driver 353. When the user touches the touch surface 105 with a finger, the finger becomes equivalent to an electrode opposed to an X electrode or a Y electrode with an insulator interposed therebetween and connected with the ground. When a voltage is applied to the X electrode or the Y electrode, an attractive force (electrostatic force) is generated between the X electrode or the Y electrode and the finger because of static electricity.

In the case where an AC voltage is applied, the electrostatic force changes cyclically. Because of the changes of the electrostatic force, the frictional force between the touch surface 105 and the finger changes cyclically. When the user slides the finger on the touch surface 105, the frictional force to be felt by the finger changes cyclically so that the user perceives a texture. When the frequency of the AC voltage is higher than 5 Hz and lower than 500 Hz, tactile sensation is perceived; when the frequency is out of this range, tactile sensation is not perceived.

In the case where an AC voltage having a first frequency f1 is applied to the X electrodes and an AC voltage having a second frequency f2 is applied to the Y electrodes, the electrostatic force changes at the first frequency f1 and the second frequency f2 and further, beat vibration occurs. The beat vibration is a phenomenon that the electrostatic force changes at the frequency of the difference between the first frequency f1 and the second frequency f2. When the frequency of the beat vibration is higher than 10 Hz and lower than 1000 Hz, a texture caused by the beat vibration is perceived; when the frequency of the beat vibration is out of this range, the texture caused by the beat vibration is not perceived.

In an example, the first frequency f1 and the second frequency f2 are determined so that both the first frequency f1 and the second frequency f2 are 500 Hz or higher and the absolute value of the difference between the first frequency f1 and the second frequency f2 is more than 10 Hz and less than 1000 Hz. For example, the first frequency f1 is 1000 Hz and the second frequency f2 is 1240 Hz.

The X electrode driver 352 supplies a part of the X electrodes connected with the X electrode driver 352 with the first AC voltage and connects the other X electrodes to the ground in accordance with the control of the main controller 356. The Y electrode driver 353 supplies a part of the Y electrodes connected with the Y electrode driver 353 with the second AC voltage and connects the other Y electrodes to the ground in accordance with the control of the main controller 356.

Assume that the touch panel 100 has five X electrodes X0 to X4 and six Y electrodes Y0 to Y5, the X electrode X1 is supplied with the first AC voltage, the Y electrode Y1 is supplied with the second AC voltage, and the X electrodes X2 to X4 and the Y electrodes Y2 to Y5 are connected to the ground. Under the foregoing conditions, beat vibration at 240 Hz occurs at the intersection of the X electrode X1 with the Y electrode Y1 on the touch surface 105; the user can perceive a texture with the finger. At the intersections of the X electrode X1 with the Y electrodes Y2 to Y5, the electrostatic force changes at 1000 Hz, but the user does not feel a texture.

At the intersections of the Y electrode Y1 with the X electrodes X2 to X4, the electrostatic force changes at 1240 Hz, but the user does not feel a texture. In the remaining region, the electrostatic force does not change and the user does not feel a texture. In this way, the tactile touch panel device 15 can present a texture at a desired place on the touch surface 105. The X electrode driver 352 and the Y electrode driver 353 can connect the X electrodes and the Y electrodes to a predetermined DC voltage source, instead of the ground.

The touch panel driver 351 serially supplies the X electrodes with a driving signal and measures the signal currents at the Y electrodes serially or together while supplying the driving signal to an X electrode. The touch panel driver 351 can serially supply a driving signal in units of groups each composed of some consecutive X electrodes or measure the signal currents of the Y electrodes in units of groups each composed of some consecutive Y electrodes.

At each intersection of an X electrode and a Y electrode, a capacitance is generated between the X electrode and the Y electrode. When the touch panel driver 351 inputs an AC signal to one X electrode, an AC current flows between the X electrode and a selected Y electrode, so that the touch panel driver 351 detects the AC current.

When a finger of the user touches the touch surface 105 at the point opposed to an intersection of an X electrode and a Y electrode, a capacitance is generated between the X electrode or the Y electrode and the finger and the capacitance between the X electrode and the Y electrode decreases. In response, the signal current (AC current) at the Y electrode decreases.

The main controller 356 instructs the touch panel driver 351 on the X electrode to give the driving signal and the Y electrode where to measure the signal current. The main controller 356 compares the signal current measured by the touch panel driver 351 with a predetermined threshold to detect that the capacitance between the X electrode and the Y electrode connected with the touch panel driver 351 has decreased.

When a capacitance has decreased, the main controller 356 determines the X electrode and the Y electrode connected with the touch panel driver 351 to locate the point where the user's finger is in contact. The contact point is the point of the touch surface 105 that is opposed to the intersection of the X electrode and the Y electrode connected with the touch panel driver 351.

Next, processing of the tactile touch panel device 15 to detect a touch point and present a texture together is described. The main controller 356 controls to which driver the switch 354 should connect each X electrode, the touch panel driver 351 or the X electrode driver 352. In similar, the main controller 356 controls to which driver the switch 355 should connect each Y electrode, the touch panel driver 351 or the Y electrode driver 353.

The main controller 356 instructs the switch 354 to connect a part of the X electrodes to the touch panel driver 351 and to connect the other X electrodes to the X electrode driver 352 and further, to serially change the X electrodes connected with the touch panel driver 351.

To change the X electrodes connected with the touch panel driver 351, the switch 354 reconnects the X electrodes that have been connected with the touch panel driver 351 to the X electrode driver 352 and reconnects a part of the X electrodes that have been connected with the X electrode driver 352 to the touch panel driver 351.

For example, the switch 354 changes the connections from the state where the X electrode X0 is connected with the touch panel driver 351 and the X electrodes X1 to X4 are connected with the X electrode driver 352 to the state where the X electrode X1 is connected with the touch panel driver 351 and the X electrodes X0 and X2 to X4 are connected with the X electrode driver 352. The switch 354 serially changes the X electrode connected with the touch panel driver 351 in the same way.

The main controller 356 instructs the switch 355 to connect a part of the Y electrodes to the touch panel driver 351 and to connect the other Y electrodes to the Y electrode driver 353 and further, instructs the switch 355 to serially change the Y electrodes connected with the touch panel driver 351. To change the Y electrodes connected with the touch panel driver 351, the switch 355 reconnects the Y electrodes that have been connected with the touch panel driver 351 to the Y electrode driver 353 and reconnects a part of the Y electrodes that have been connected with the Y electrode driver 353 to the touch panel driver 351.

For example, the switch 355 changes the connections from the state where the Y electrode Y0 is connected with the touch panel driver 351 and the Y electrodes Y1 to Y5 are connected with the Y electrode driver 353 to the state where the Y electrode Y1 is connected with the touch panel driver 351 and the Y electrodes Y0 and Y2 to Y5 are connected with the Y electrode driver 353. The switch 355 serially changes the Y electrode connected with the touch panel driver 351 in the same way.

The main controller 356 controls the X electrode driver 352 to apply the first AC voltage to the X electrodes for the region to present a texture and to connect the other X electrodes to the ground. The main controller 356 controls the Y electrode driver 353 to apply the second AC voltage to the Y electrodes for the region to present a texture and to connect the other Y electrodes to the ground.

The main controller 356 performs serial control to connect the X electrodes and the Y electrodes in turn to the touch panel driver 351 in order to detect a touch on the touch surface 105. The touch surface 105 is scanned to detect a touch point. After completion of scanning the entire touch surface 105, the main controller 356 repeats the processing to connect the X electrodes and the Y electrodes in turn to the touch panel driver 351. As a result, the scanning is repeated and when the user touches some point of the touch surface 105, the touch point is detected.

Specified one or a plurality of consecutive X electrodes are supplied with the first AC voltage and specified one or a plurality of consecutive Y electrodes are supplied with the second AC voltage when they are not connected with the touch panel driver 351. The other X electrodes and Y electrodes are connected with the ground. As a result, a texture is presented in a specific region in the touch surface 105.

As a result of the foregoing control of the X electrodes and Y electrodes, a part of the touch surface 105 is used for touch detection and the other part is used to present a texture, while the part used for touch detection is successively relocated. Each part of the touch surface 105 is used for touch detection in some period and used to present a texture in the other period.

As set forth above, embodiments of this disclosure have been described; however, this disclosure is not limited to the foregoing embodiments. Those skilled in the art can easily modify, add, or convert each element in the foregoing embodiments within the scope of this disclosure. A part of the configuration of one embodiment can be replaced with a configuration of another embodiment or a configuration of an embodiment can be incorporated into a configuration of another embodiment.

What is claimed is:

1. A touch panel comprising:
   a support substrate;
   a plurality of X electrodes disposed on the support substrate;
   a plurality of Y electrodes disposed on the support substrate in such a manner that each of the plurality of Y electrodes intersects the plurality of X electrodes and is isolated from the plurality of X electrodes;
   a plurality of X floating electrodes laminated on a first insulating layer at places opposed to the plurality of X electrodes;
   a plurality of Y floating electrodes laminated on the first insulating layer at places opposed to the plurality of Y electrodes; and
   a second insulating layer covering the plurality of X floating electrodes and the plurality of Y floating electrodes,
   wherein area of X electrodes is smaller than area of X floating electrodes and area of Y electrodes is smaller than area of Y floating electrodes in a unit lattice region of a lattice formed of the plurality of X electrodes and the plurality of Y electrodes, wherein a mutual capacitance generated between an X electrode and a Y electrode decreases when a surface of the second insulating layer is touched by a pointer, and wherein, in areas where the plurality of X floating electrodes and the plurality of Y floating electrodes are separated and the plurality of X electrodes and the plurality of Y electrodes are separated in planar view, the plurality of X floating electrodes are separated from the plurality of Y electrodes and the plurality of Y floating electrodes are separated from the plurality of X electrodes in planar view.

2. The touch panel according to claim 1,
wherein the plurality of X floating electrodes and the plurality of Y floating electrodes are island-like electrodes separated from the other electrodes.

3. The touch panel according to claim 1,
wherein thickness from top faces of the plurality of X electrodes to the surface of the second insulating layer is not more than 50 μm, and
wherein thickness from top faces of the plurality of Y electrodes to the surface of the second insulating layer is not more than 50 μm.

4. The touch panel according to claim 1,
wherein the pointer is a finger or a conductor electrically coupled to the finger, and
wherein the following condition is satisfied:

$$C_{f2} < C_{nt} + \sqrt{C_{nt}^2 + C_{nt}C_b}$$

where $C_{f2}$ represents a combined capacitance obtained by connecting a capacitance generated between an X floating electrode and the pointer and a capacitance generated between the X floating electrode and the X electrode facing the X floating electrode in series or a combined capacitance obtained by connecting a capacitance generated between a Y floating electrode and the pointer and a capacitance generated between the Y floating electrode and the Y electrode facing the Y floating electrode in series; $C_{nt}$ represents a mutual capacitance generated between the X electrode and the Y electrode when the surface of the second insulating layer is not touched by the pointer; and $C_b$ represents a body capacitance of a human having the finger.

5. The touch panel according to claim 1, wherein the plurality of X electrodes, the plurality of Y electrodes, the plurality of X floating electrodes, and the plurality of Y floating electrodes are used to present a texture to the pointer, which is a finger.

6. A touch panel device comprising:
the touch panel according to claim 1; and
a controller for the touch panel,
wherein the controller is configured to determine a touch point on the touch panel by measuring a variation in mutual capacitance between each of the plurality of X electrodes and each of the plurality of Y electrodes with a driving signal having an angular frequency ω,
wherein the pointer is a finger or a conductor electrically coupled with the finger, and
wherein the following condition is satisfied:

$$\left| \frac{Z_2}{Z_1^2 + 2Z_1 Z_2} \right| < |j\omega C_{nt}|$$

where $Z_1$ represents a combined impedance obtained by connecting a capacitance generated between an X floating electrode and the pointer and a capacitance generated between the X floating electrode and the X electrode facing the X floating electrode in series or a combined impedance obtained by connecting a capacitance generated between a Y floating electrode and the pointer and a capacitance generated between the Y floating electrode and the Y electrode facing the Y floating electrode in series; $Z_2$ represents a impedance of a body of a human having the finger; $C_{nt}$ represents a mutual capacitance generated between the X electrode and the Y electrode when the surface of the second insulating layer is not touched by the pointer; and j represents an imaginary number.

7. A touch panel device comprising
the touch panel according to claim 1; and
a controller for the touch panel,
wherein the controller is configured to determine a touch point on the touch panel by measuring a variation in mutual capacitance between each of the plurality of X electrodes and each of the plurality of Y electrodes with a driving signal having an angular frequency ω,
wherein the pointer is a finger or a conductor electrically coupled with the finger, and
wherein the following, condition is satisfied:

$$\frac{C_{f2}^4 (1 + \omega^2 C_b^2 R_b^2)}{(C_b + 2C_{f2})^2 + 4\omega^2 C_b^2 C_{f2}^2 R_b^2} < C_{nt}^2$$

where $C_{f2}$ represents a combined capacitance obtained by connecting a capacitance generated between an X floating electrode and the pointer and a capacitance generated between the X floating electrode and the X electrode facing the X floating electrode in series or a combined capacitance obtained by connecting a capacitance generated between a Y floating electrode and the pointer and a capacitance generated between the Y floating electrode and the Y electrode facing the Y floating electrode in series; $C_{nt}$ represents a mutual capacitance generated between the X electrode and the Y electrode when the surface of the second insulating layer is not touched by the pointer; $C_b$ represents a body capacitance of a human having the finger; and $R_b$ represents a body resistance of the human having the finger.

8. A tactile touch panel device comprising:
the touch panel according to claim 1; and
a controller for the touch panel,
wherein the controller is configured to:
determine a touch point on the touch panel by measuring a variation in mutual capacitance between each of the plurality of X electrodes and each of the plurality of Y electrodes with a driving signal; and
present a texture by supplying the X electrodes and the Y electrodes other than the X electrodes and the Y electrodes used to measure mutual capacitances with driving signals at different frequencies having a predetermined frequency difference.

9. The touch panel according to claim 1,
wherein the pointer is a finger or a conductor electrically coupled to the finger, and
wherein the following condition is satisfied:

$$C_{f2} < C_{nt} + \sqrt{C_{nt}^2 + C_{nt} \times 10^{-10}}$$

where $C_{f2}$ represents a combined capacitance obtained by connecting a capacitance generated between an X floating electrode and the pointer and a capacitance generated between the X floating electrode and the X electrode facing the X floating electrode in series or a combined capacitance obtained by connecting a capacitance generated between a Y floating electrode and the pointer and a capacitance generated between the Y floating electrode and the Y electrode facing the Y floating electrode in series and $C_{nt}$ represents a mutual capacitance generated between the X electrode and the Y electrode when the surface of the second insulating layer is not touched by the pointer.

10. A touch panel device comprising:
the touch panel according to claim 1; and
a controller for the touch panel,
wherein the controller is configured to determine a touch point on the touch panel by measuring a variation in mutual capacitance between each of the plurality of X electrodes and each of the plurality of Y electrodes with a driving signal having an angular frequency ω,
wherein the pointer is a finger or a conductor electrically coupled with the finger, and
wherein the following condition is satisfied $$\left| \frac{500(-2j \times 10^7 + 3\omega)}{Z_1\{-2j \times 10^{10} + \omega(3000 + Z_1)\}} \right| < |j\omega C_{nt}|$$

where $Z_1$ represents a combined impedance obtained by connecting a capacitance generated between an X floating electrode and the pointer and a capacitance generated between the X floating electrode and the X electrode facing the X floating electrode in series or a combined impedance obtained by connecting a capacitance generated between a Y floating electrode and the pointer and a capacitance generated between the Y floating electrode and the Y electrode facing the Y floating electrode in series; and j represents an imaginary number.

11. A touch panel device comprising:
the touch panel according to claim 1; and
a controller for the touch panel,
wherein the controller is configured to determine a touch point on the touch panel by measuring a variation in mutual capacitance between each of the plurality of X electrodes and each of the plurality of Y electrodes with a driving signal having an angular frequency ω,
wherein the pointer is a finger or a conductor electrically coupled with the finger, and
wherein the following condition is satisfied:

$$\frac{C_{f2}^4(1 + 2.25 \times 10^{-14} \times \omega^2)}{(1 \times 10^{-10} + 2C_{f2})^2 + 9 \times 10^{-14} \times C_{f2}^2 \omega^2} < C_{nt}^2$$

where $C_{f2}$ represents a combined capacitance obtained by connecting a capacitance generated between an X floating electrode and the pointer and a capacitance generated between the X floating electrode and the X electrode facing the X floating electrode in series or a combined capacitance obtained by connecting a capacitance generated between a Y floating electrode and the pointer and a capacitance generated between the Y floating electrode and the Y electrode facing the Y floating electrode in series; and $C_{nt}$ represents a mutual capacitance generated between the X electrode and the Y electrode when the surface of the second insulating layer is not touched by the pointer.

\* \* \* \* \*